(12) United States Patent
Lang et al.

(10) Patent No.: US 6,477,295 B1
(45) Date of Patent: Nov. 5, 2002

(54) PUMP COUPLING OF DOUBLE CLAD FIBERS

(75) Inventors: Robert J. Lang, Pleasanton; Robert G. Waarts, Fremont, both of CA (US); Ian J. Booth, Sooke (CA); David M. Giltner, Fremont; Steven Sanders, Palo Alto, both of CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 09/488,166

(22) Filed: Jan. 20, 2000

Related U.S. Application Data

(63) Continuation-in-part of application No. 09/007,708, filed on Jan. 15, 1998, now abandoned.
(60) Provisional application No. 60/035,533, filed on Jan. 16, 1997.

(51) Int. Cl.[7] .............................. G02B 6/26; G02B 6/22; H01S 3/07
(52) U.S. Cl. ........................ 385/31; 385/27; 385/127; 372/6
(58) Field of Search ................... 385/27, 28, 31–33, 385/123–128; 372/6

(56) References Cited

U.S. PATENT DOCUMENTS

| | | |
|---|---|---|
| 3,230,474 A | 1/1966 | Keck et al. |
| 3,808,549 A | 4/1974 | Maurer |
| 4,191,446 A | 3/1980 | Arditty et al. ............ 350/96.16 |
| 4,281,891 A | 8/1981 | Shinohara et al. ........ 350/96.18 |
| 4,314,740 A | 2/1982 | Bickel ...................... 350/96.15 |
| 4,351,585 A | 9/1982 | Winzer et al. ............ 350/96.15 |
| 4,465,335 A | 8/1984 | Eppes ...................... 350/96.21 |
| 4,750,795 A | 6/1988 | Blotekjaer ................ 350/96.15 |
| 4,815,079 A | 3/1989 | Snitzer et al. ................. 372/6 |
| 5,136,420 A | 8/1992 | Inagaki et al. ............... 359/341 |
| 5,163,058 A | 11/1992 | Farries et al. ................... 372/6 |
| 5,170,458 A | 12/1992 | Aoyagi et al. ............... 385/127 |
| 5,263,036 A | 11/1993 | De Bernardi et al. ........... 372/6 |
| 5,268,978 A | 12/1993 | Po et al. ......................... 385/33 |
| 5,337,380 A | 8/1994 | Darbon et al. ................. 385/28 |
| 5,432,876 A | 7/1995 | Appledorn et al. ............ 385/31 |
| 5,448,586 A | 9/1995 | Shumulovich et al. ........ 372/70 |
| 5,854,865 A | 12/1998 | Goldberg ....................... 385/31 |
| 5,887,009 A | * 3/1999 | Mandella et al. ............... 372/6 |
| 5,987,199 A | * 11/1999 | Zarian et al. .................. 385/31 |

FOREIGN PATENT DOCUMENTS

| | | | |
|---|---|---|---|
| WO | WO 95/10868 | * | 4/1995 |
| WO | 9620519 | | 7/1996 |

* cited by examiner

Primary Examiner—Rodney Bovernick
Assistant Examiner—Juliana K. Kang
(74) Attorney, Agent, or Firm—Allen, Dyer, Doppelt, Milbrath & Gilchrist, P.A.

(57) ABSTRACT

Apparatus for coupling light into a fiber, such as a double clad fiber (DCF) having a core having a refractive index $n_1$, surrounded by an inner cladding having refractive index $n_2$ which is surrounded by an outer cladding having a refractive index $n_3$, where $n_1 > n_2 > n_3$. An optical coupler medium, referred to as a Fiber Space Division Multiplexor or FSDM, is formed on an exposed portion of the fiber inner cladding at a position along the length of the fiber without interfering with the continuity of its core and provides at, at least one position, the imaging of light external of the fiber into the inner cladding interface and its waveguiding with the inner cladding of the fiber. The FSDM coupler comprises an optical material in optical contact or integrated with the inner cladding and having a refractive index substantially equal to $n_2$. The coupler medium may also be employed with a fiber having no core and where the inner cladding would function as a multimode core. Also, disclosed are formed reflectors for reflecting back residual, unabsorbed pump light backward into the DCF inner cladding for absorption within the core doped with a rare earth active material. Other embodiments provided for the removal of pump light from the DCF inner cladding.

22 Claims, 14 Drawing Sheets

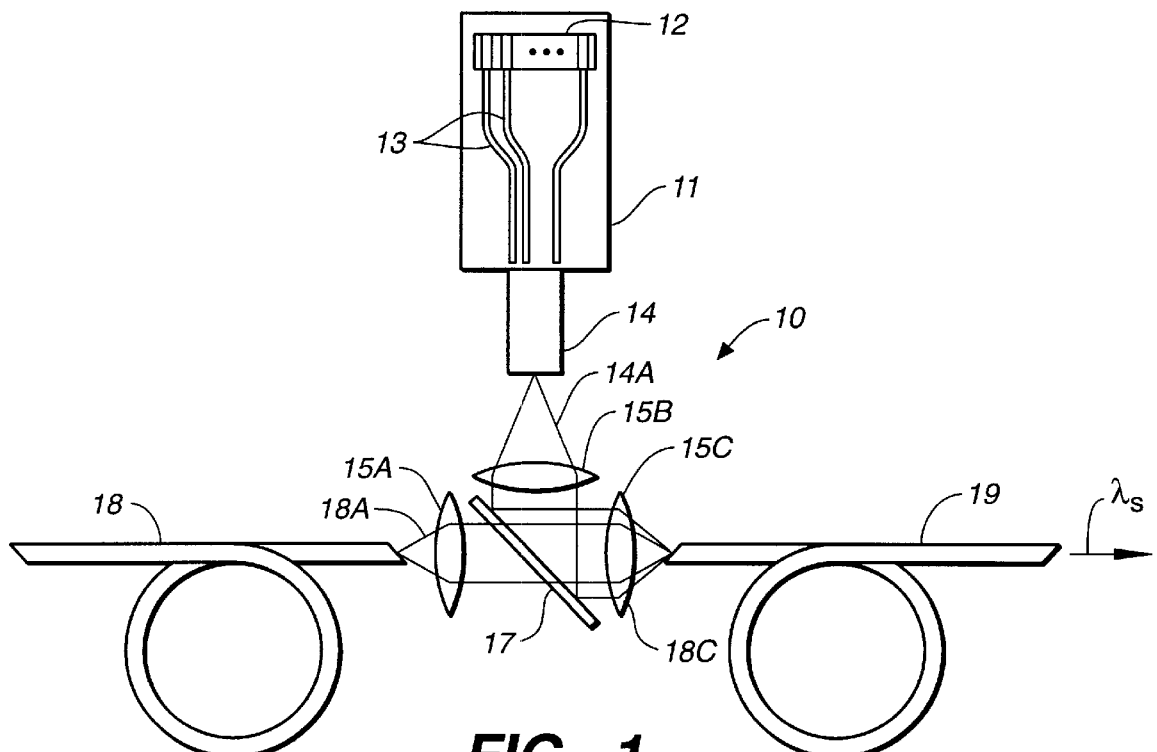
FIG._1
(PRIOR ART)
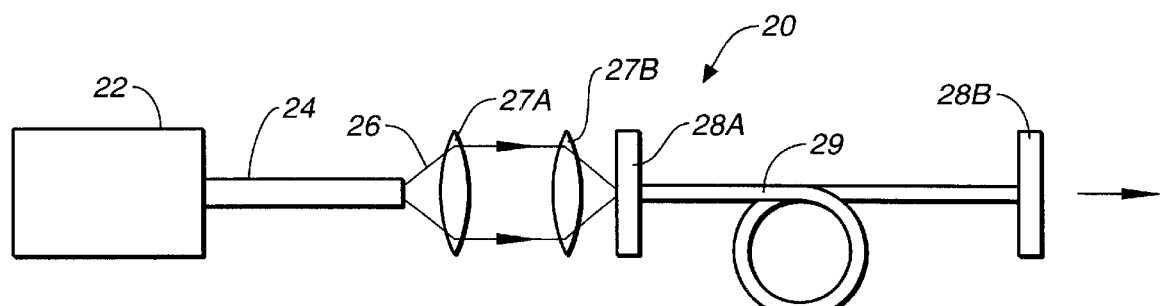
FIG._2
(PRIOR ART)

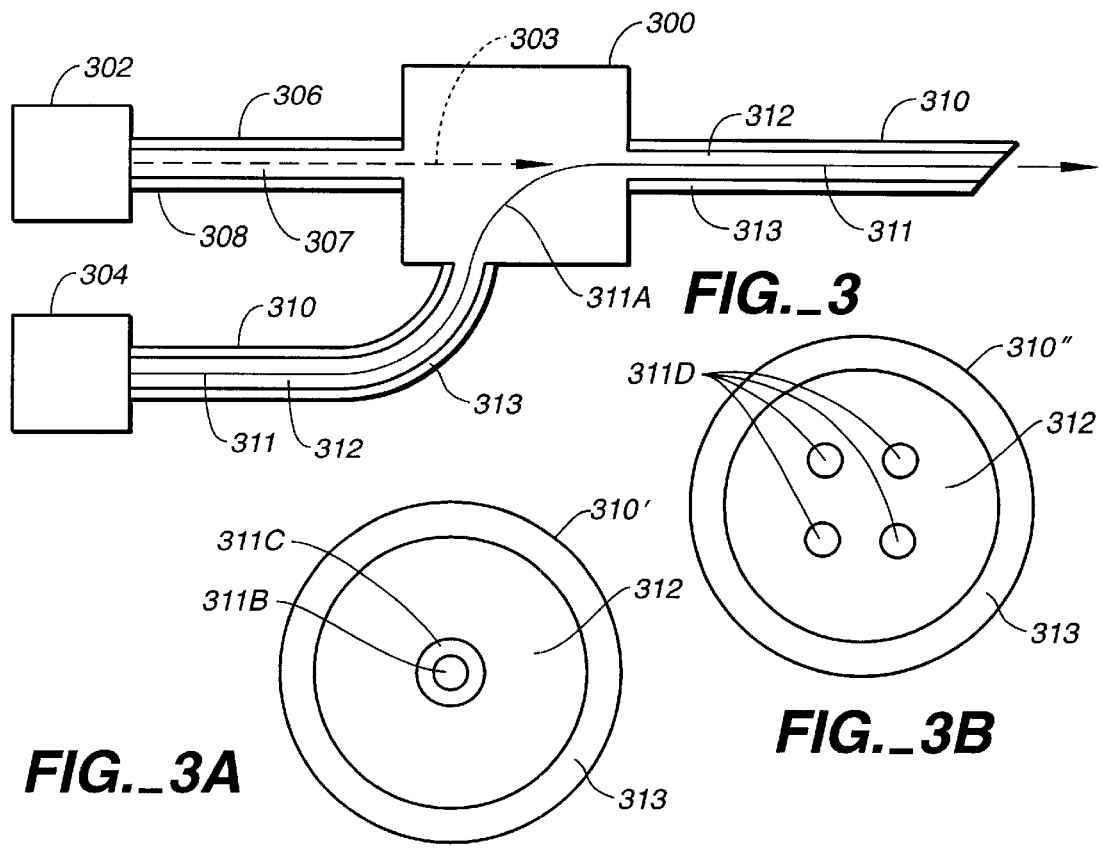
FIG._3
FIG._3A
FIG._3B
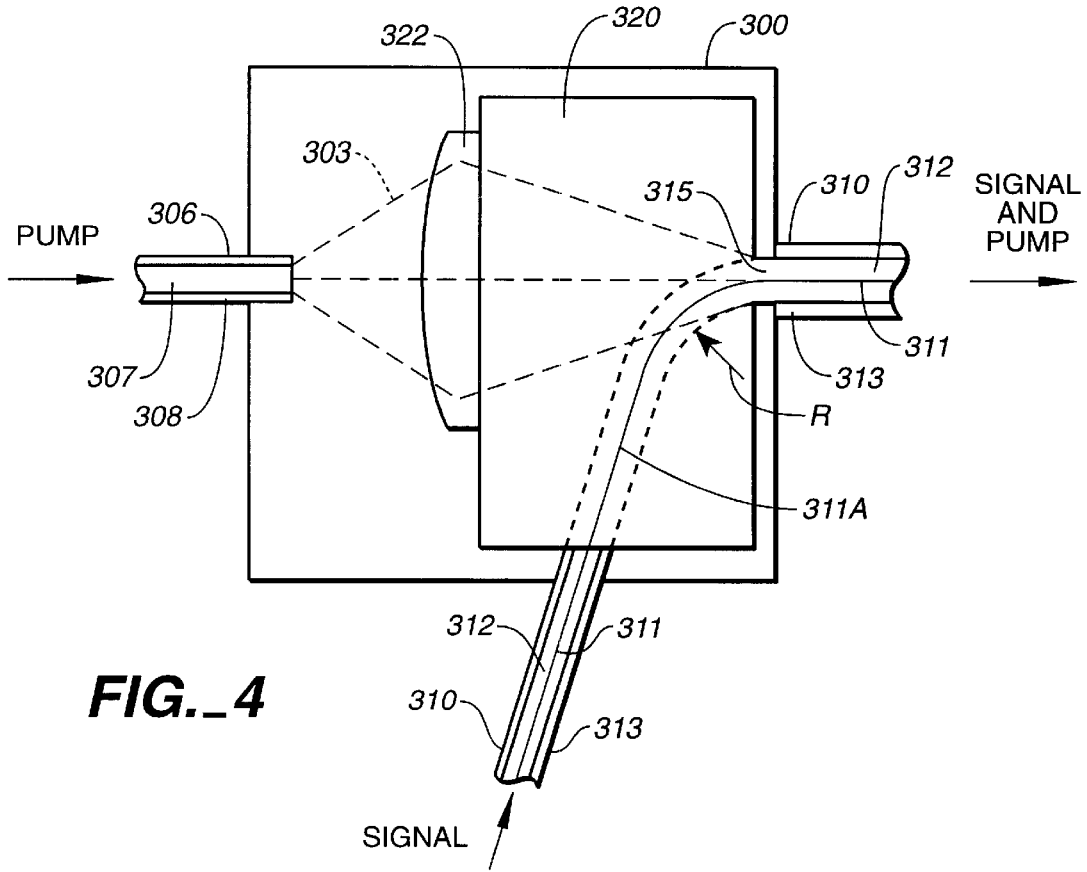
FIG._4

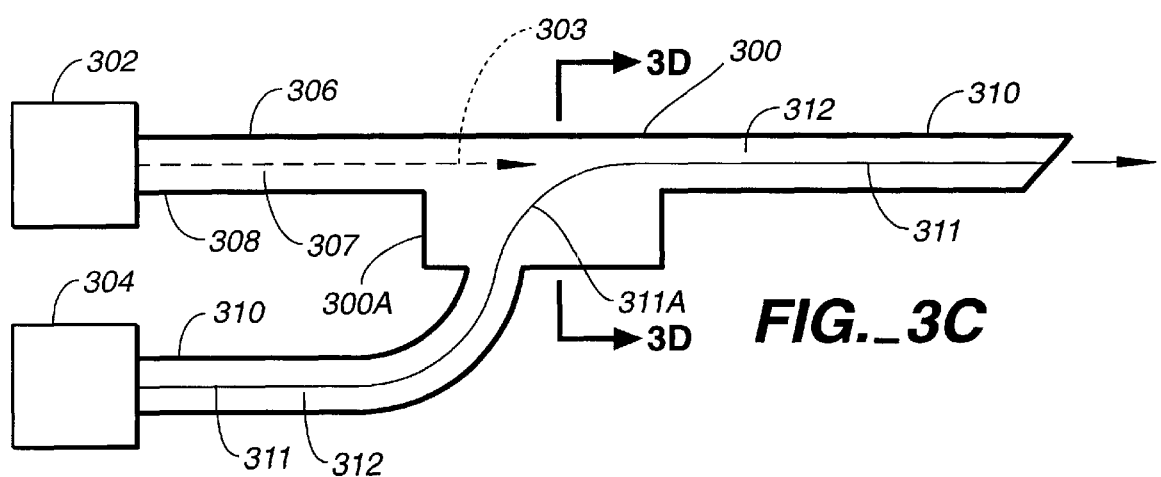
FIG._3C
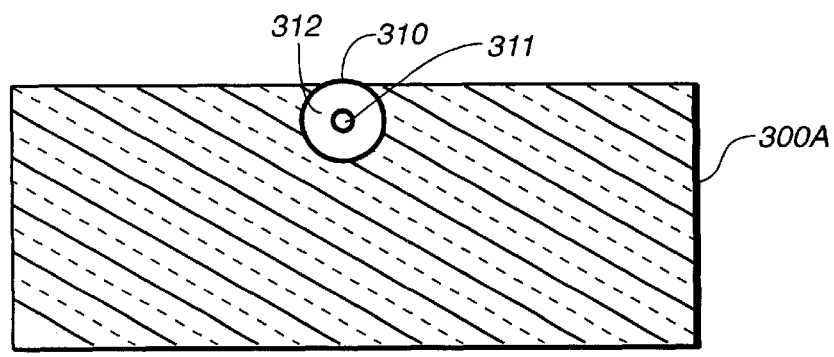
FIG._3D

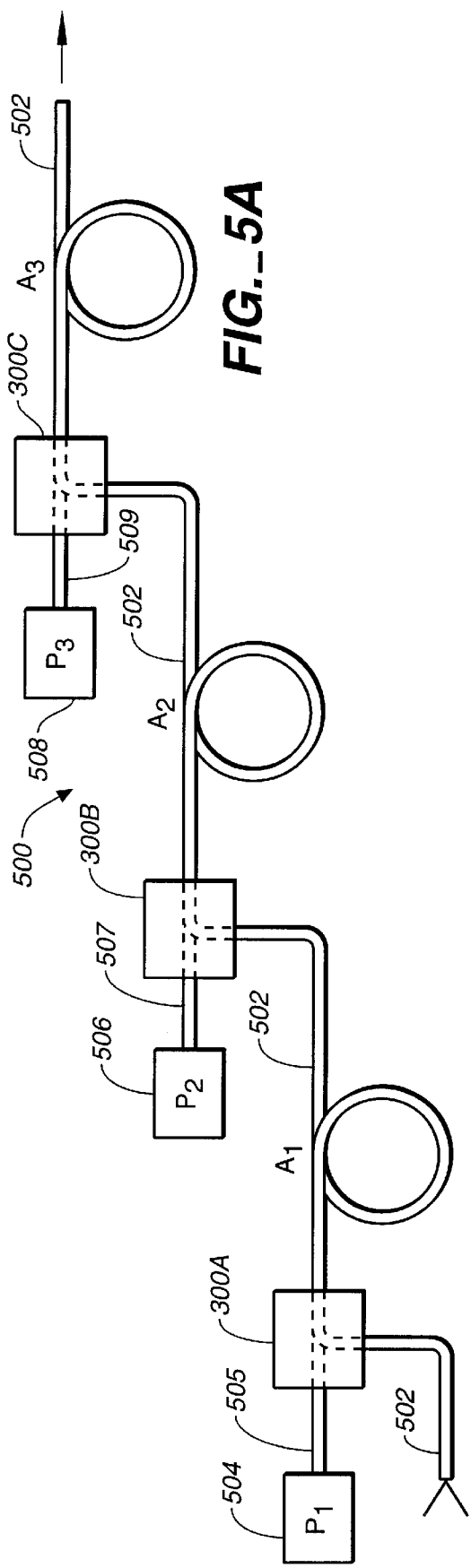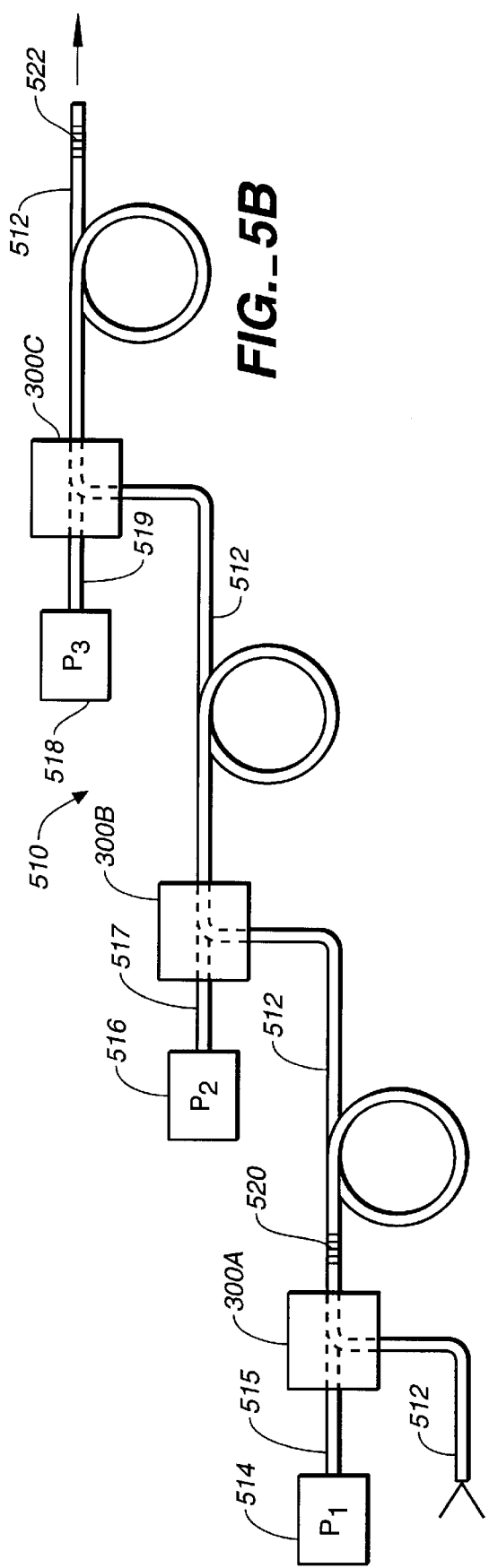

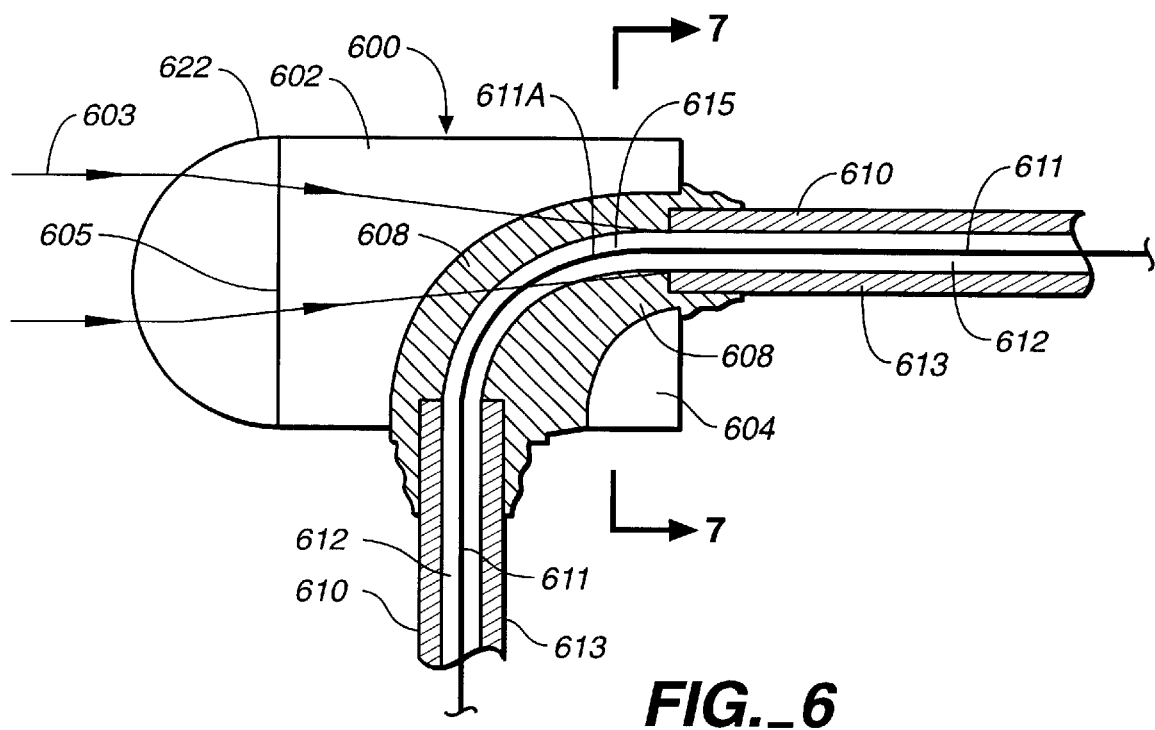
FIG._6
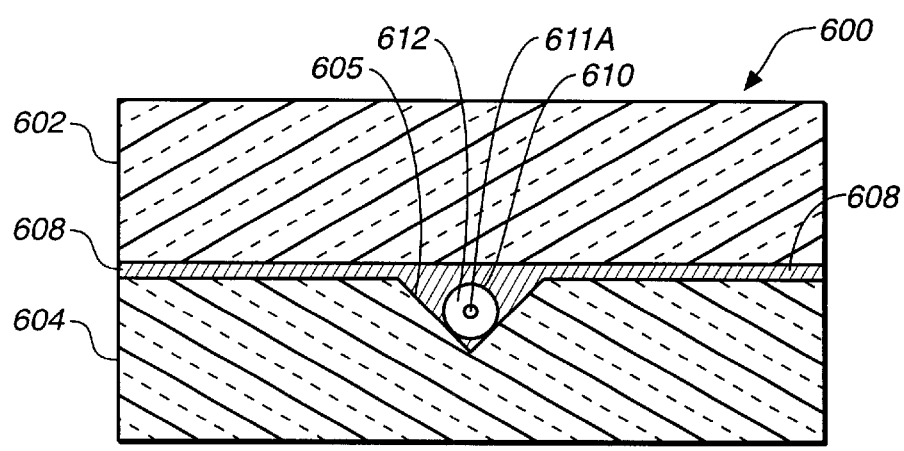
FIG._7

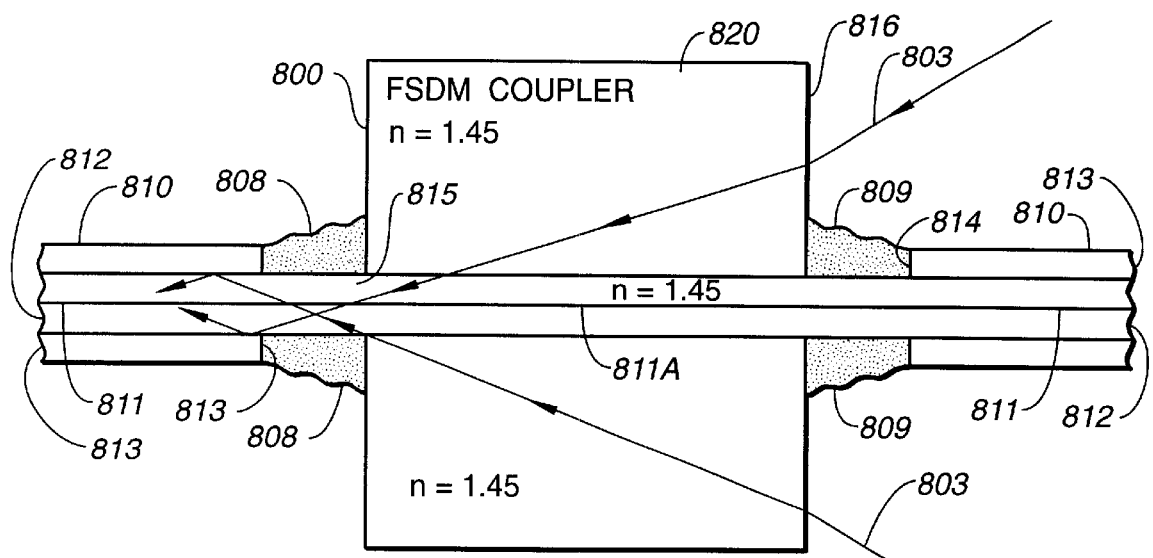
FIG._8
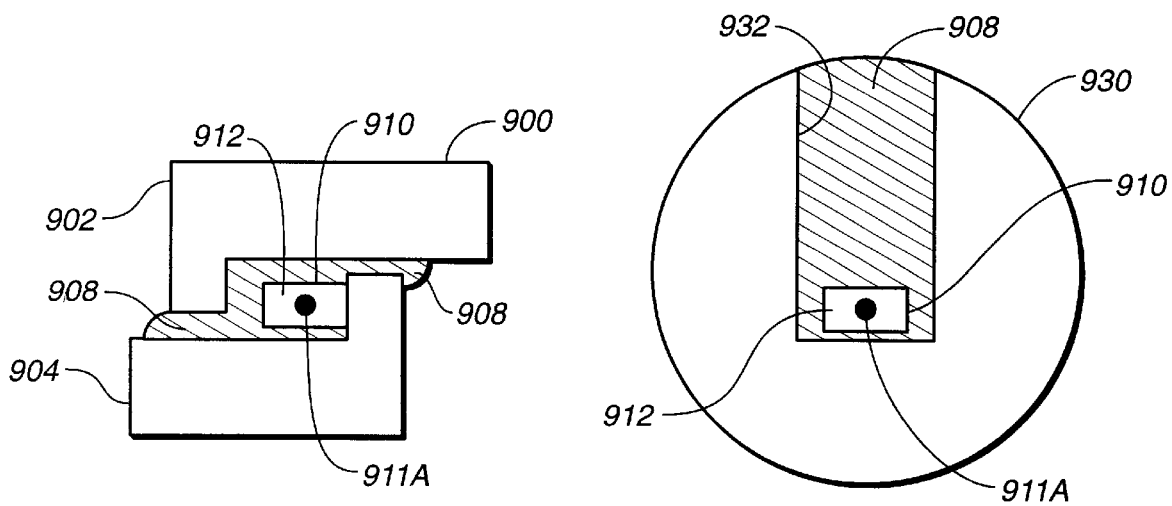
FIG._9A  FIG._9B

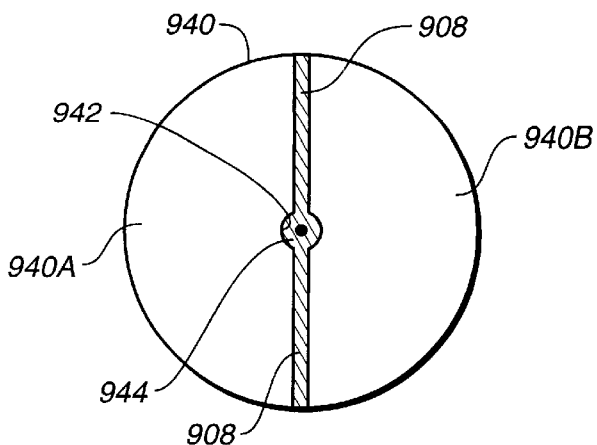
FIG._9C
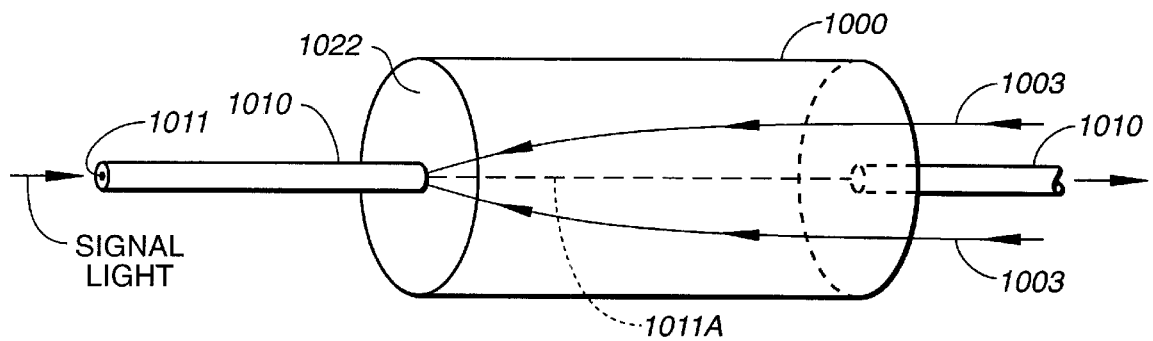
FIG._10
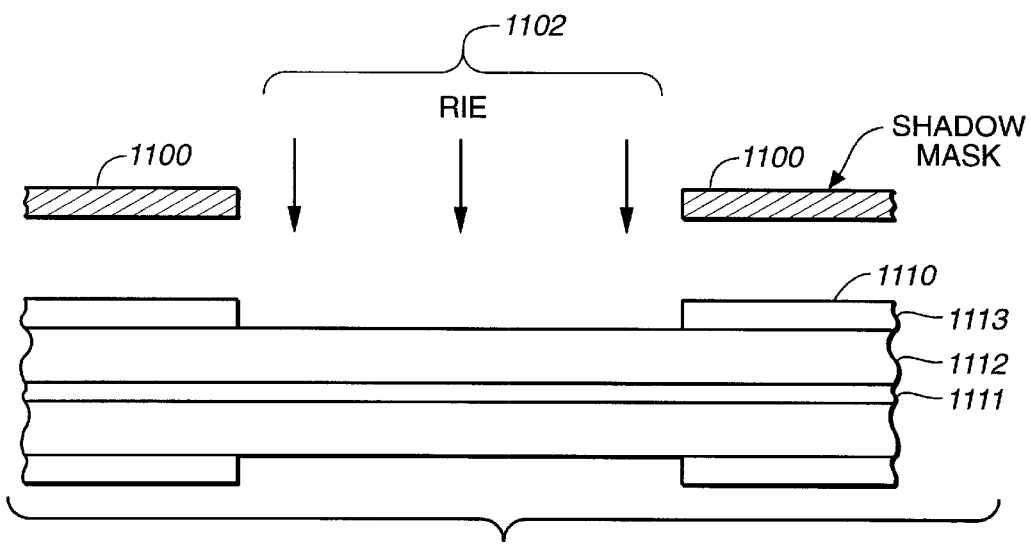
FIG._11

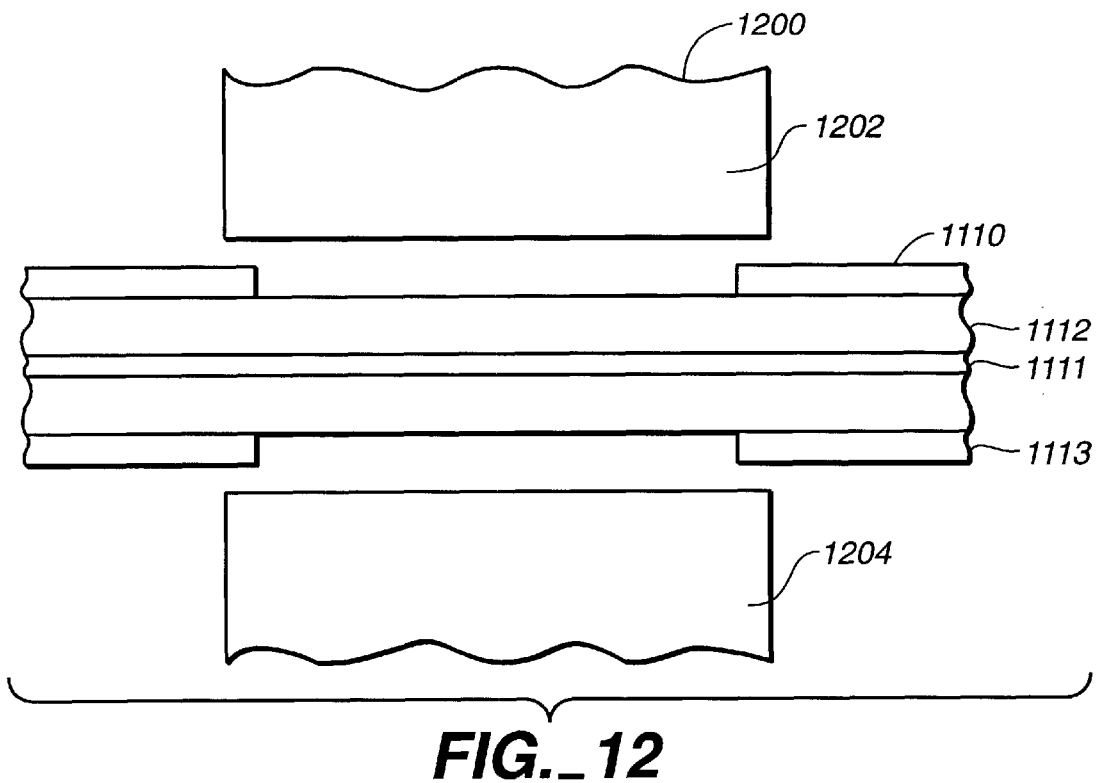
FIG._12
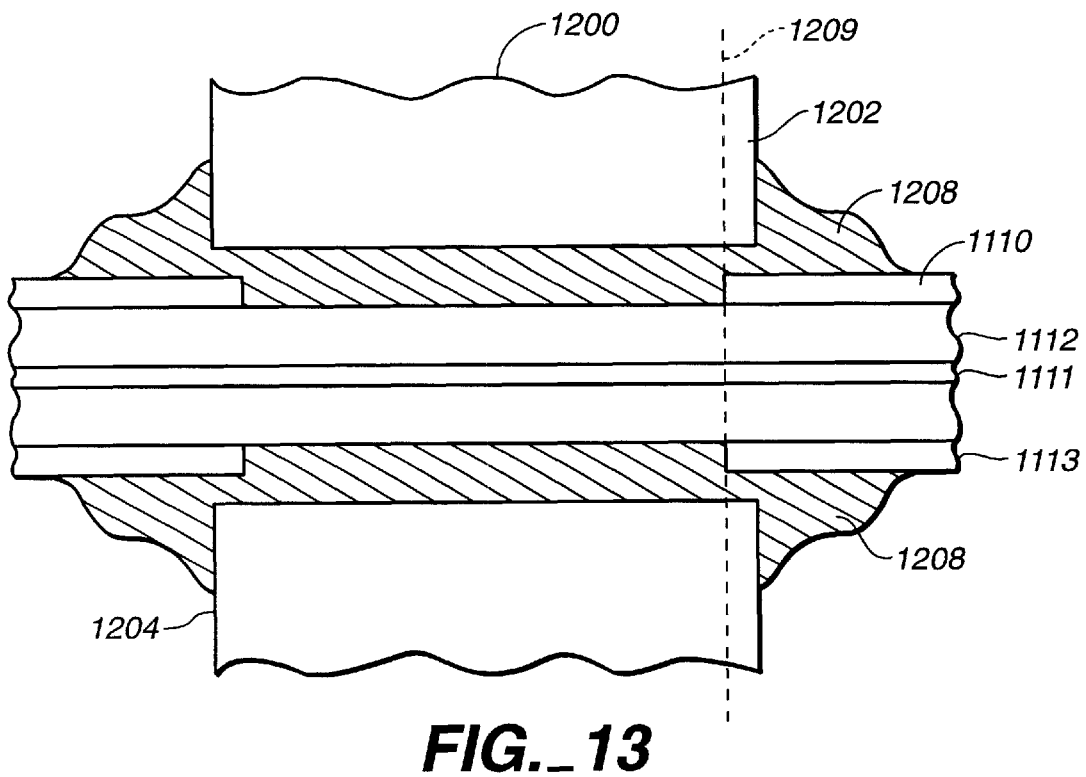
FIG._13

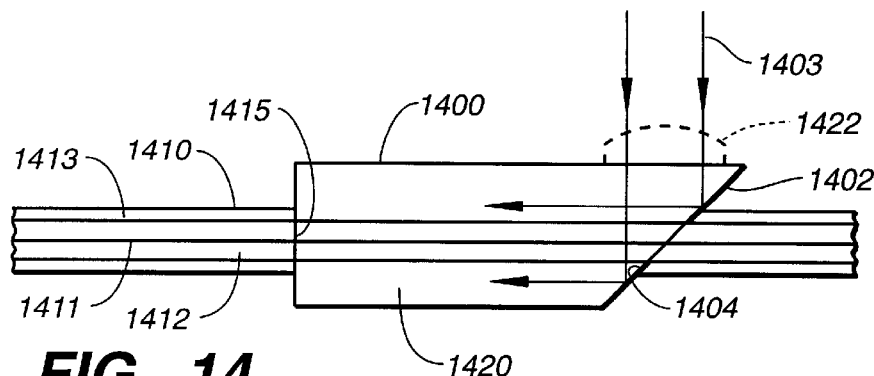
FIG._14
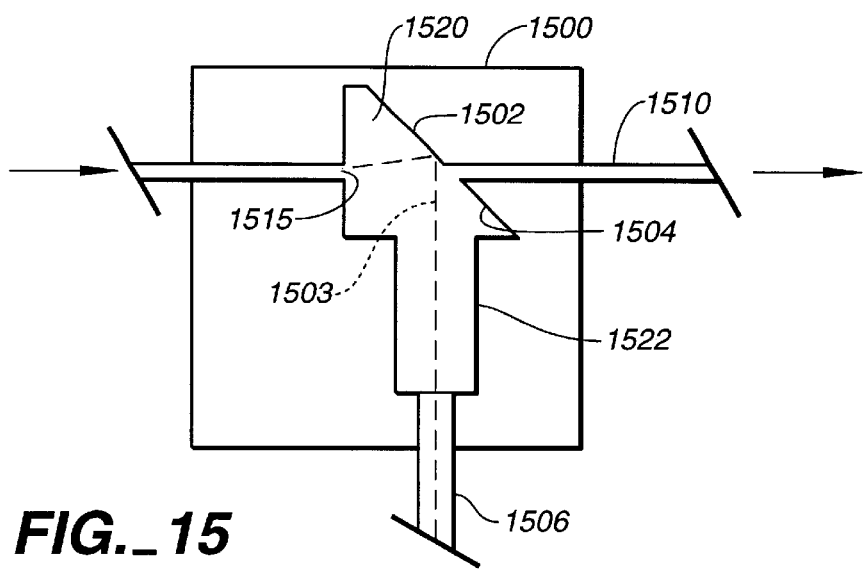
FIG._15
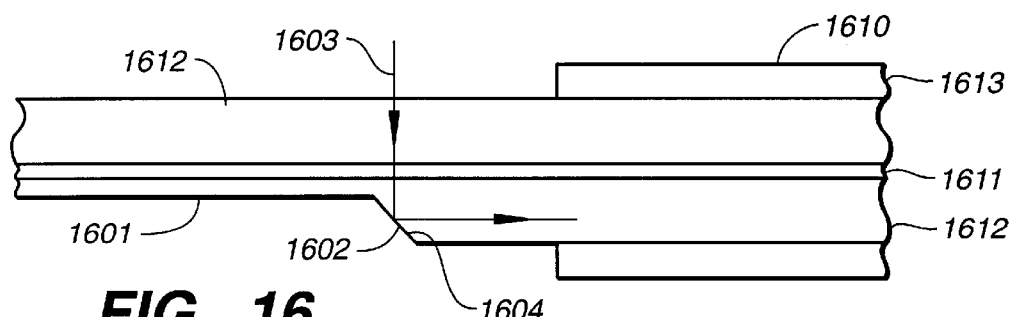
FIG._16
(PRIOR ART)

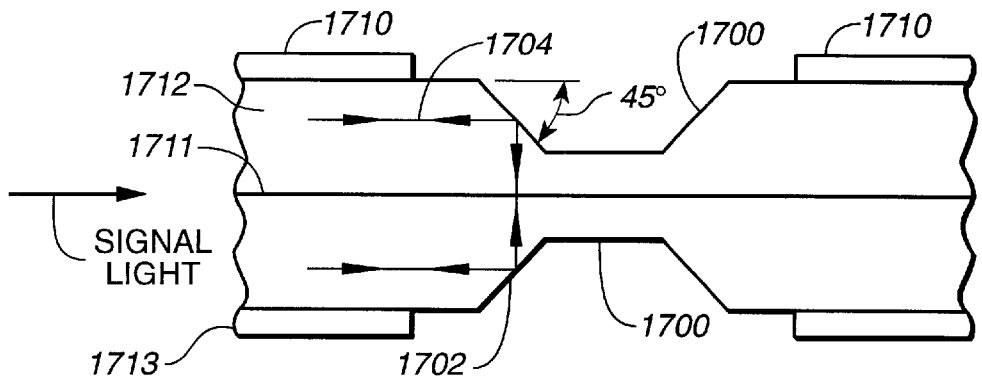
FIG._17
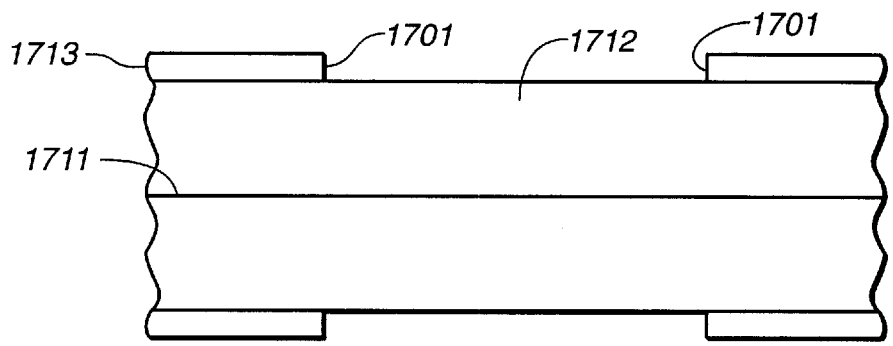
FIG._18
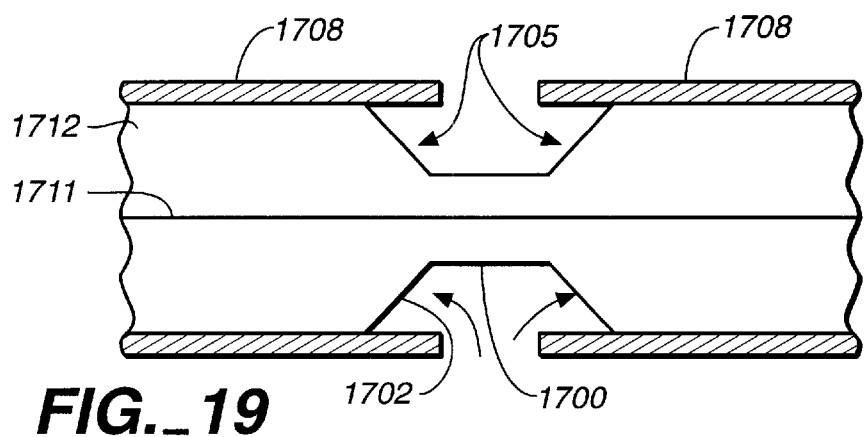
FIG._19

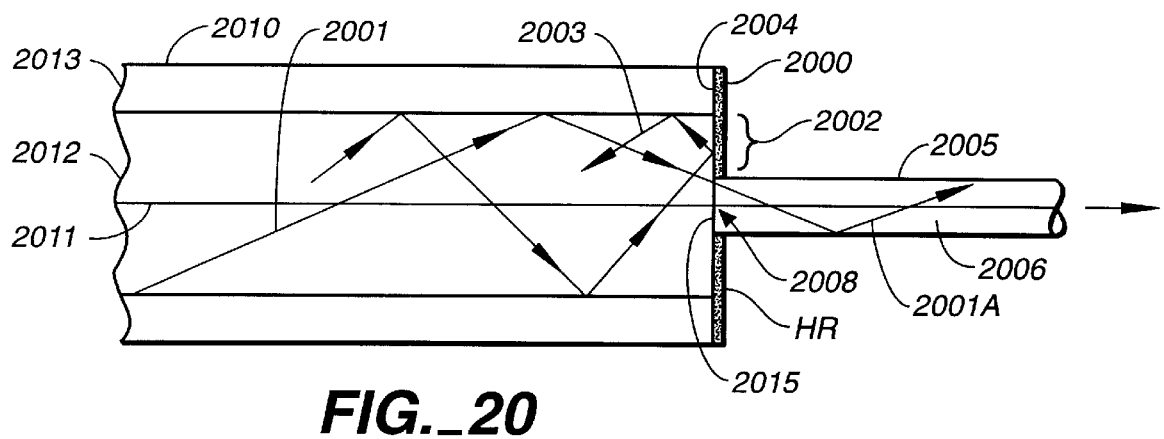
FIG._20
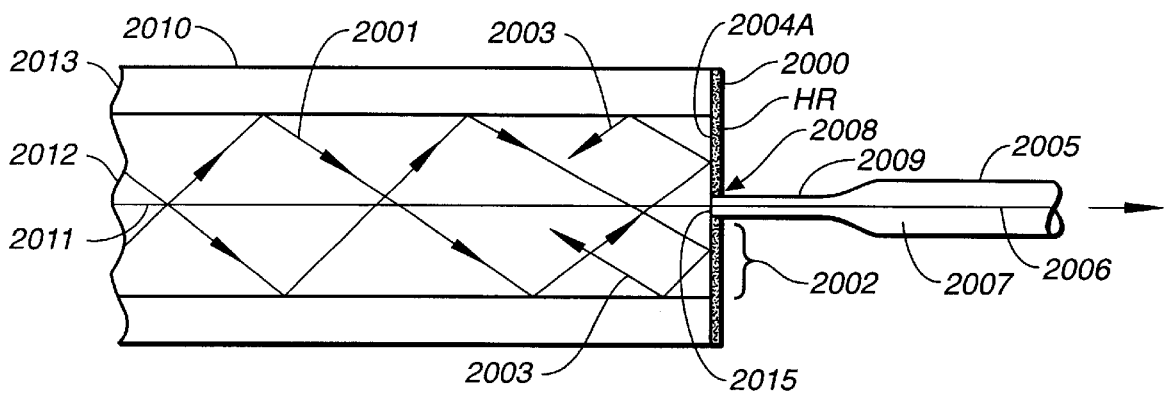
FIG._21
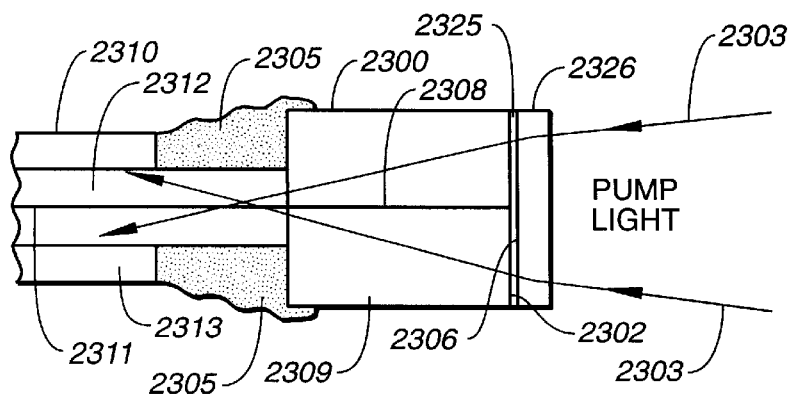
FIG._23

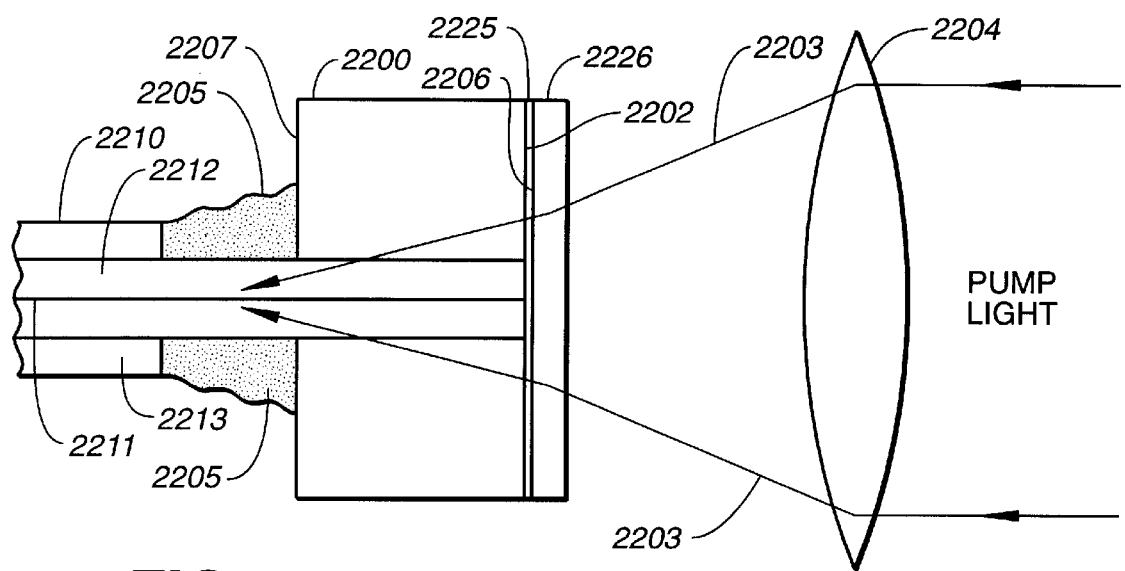
FIG._22
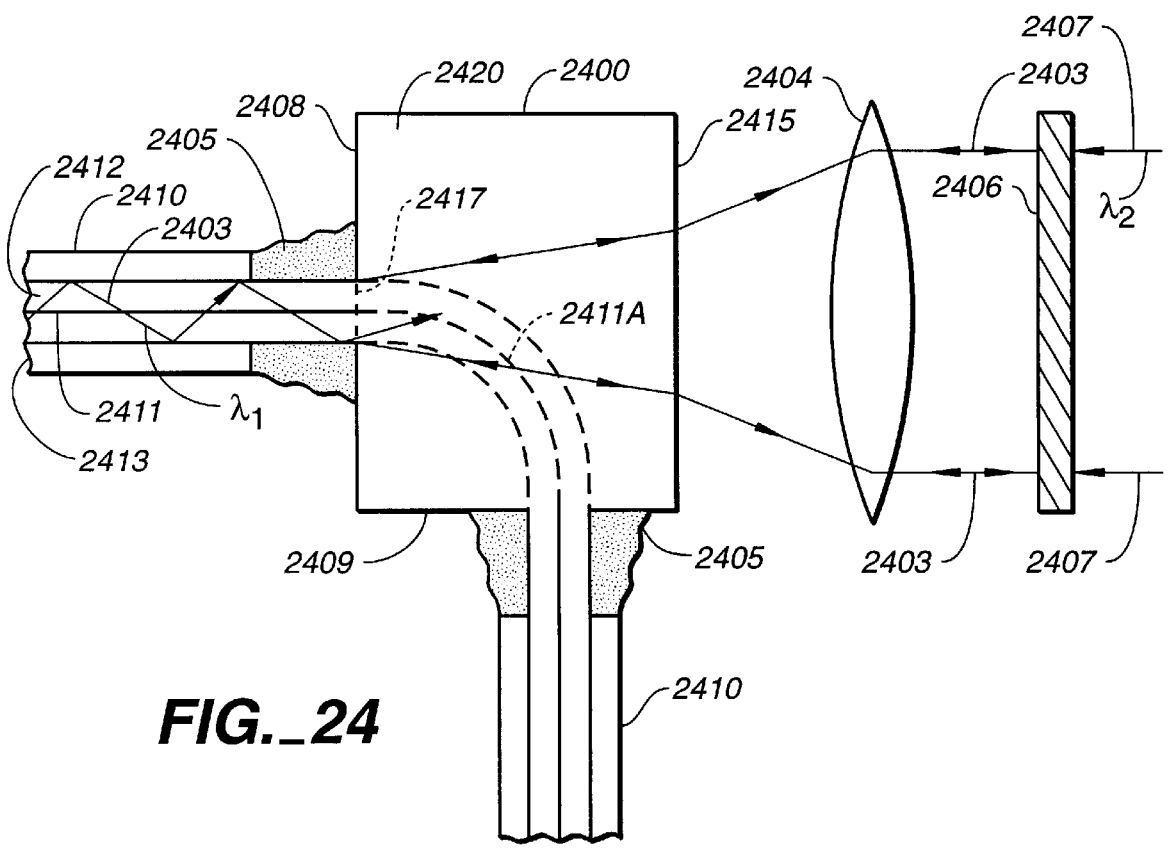
FIG._24

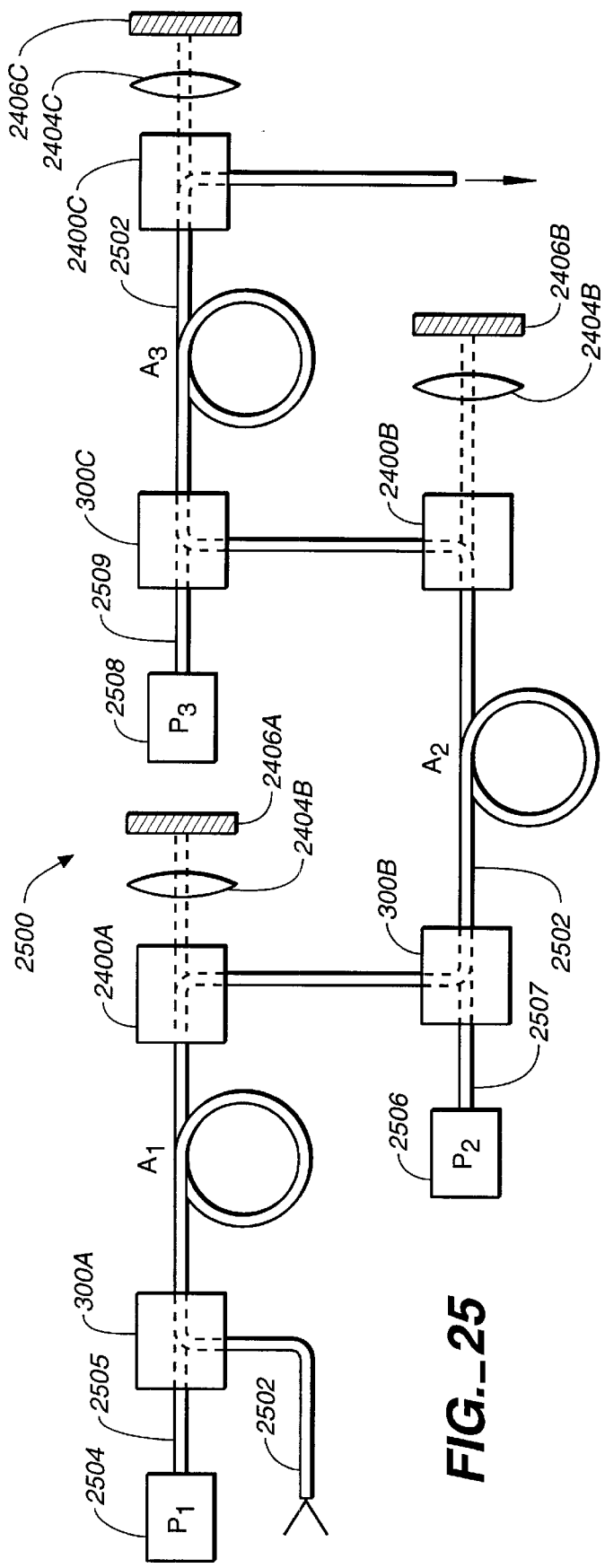
FIG._25

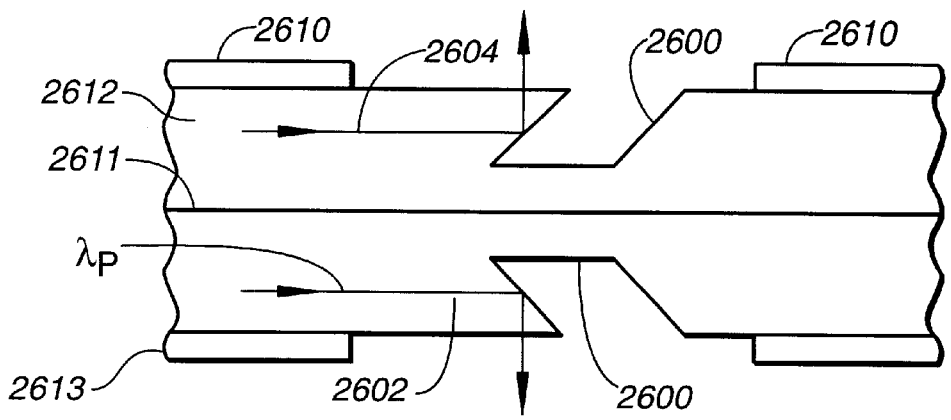
FIG._26
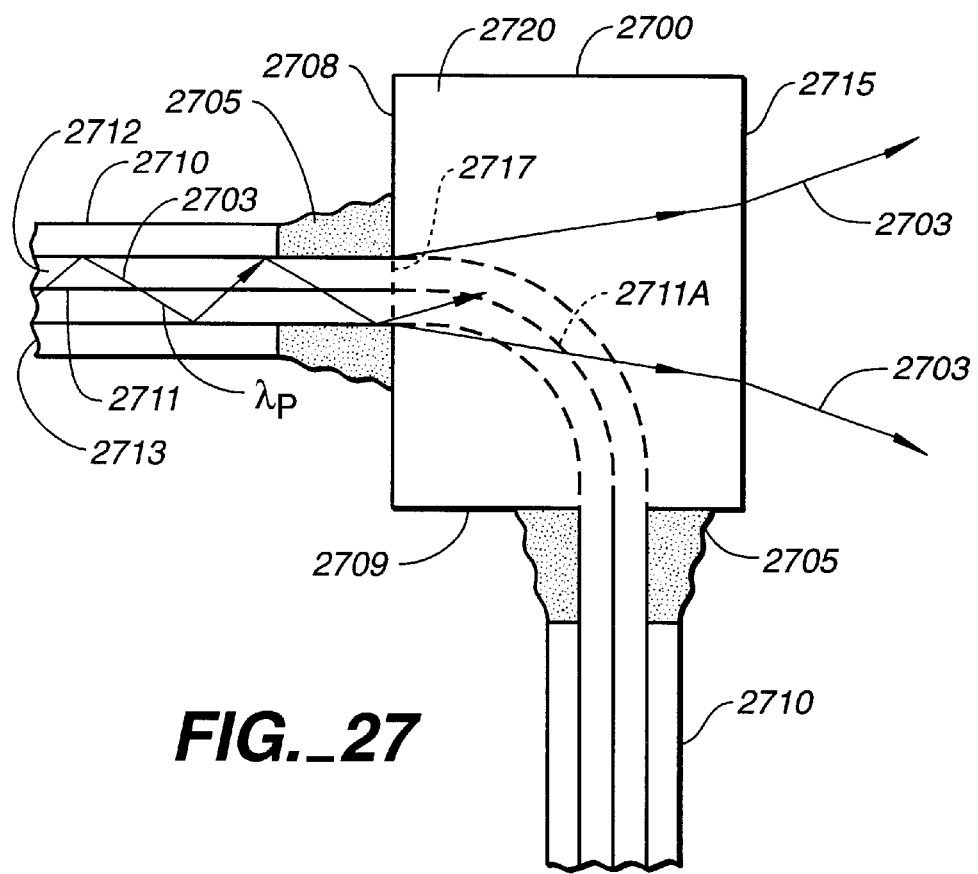
FIG._27

PUMP COUPLING OF DOUBLE CLAD FIBERS

REFERENCE TO RELATED APPLICATION

This application is a continuation-in-part of patent application, Ser. No. 09/007,708, filed Jan. 15, 1998, now abandoned which claims priority benefits of prior filed copending provisional application entitled, PUMP COUPLING OF DOUBLE CLAD FIBERS, Ser. No. 60/035,533, filed Jan. 16, 1997, and are incorporated herein by their reference.

BACKGROUND OF THE INVENTION

FIELD OF THE INVENTION

This invention relates to optical pump coupling of pump light, such as from a light source, to an optical guide, such as an optic fiber, and more particularly to highly efficient coupling of pump light from a multimode fiber into the inner cladding of a double clad fiber (DCF).

BACKGROUND OF THE INVENTION

The use of double clad fibers (DCFs) have increasingly become important in optical applications requiring higher powers of amplified light or high power fiber lasers. The advent of DCFs has been known in the art for many years starting, for example, with U.S. Pat. No. 3,808,549 to Maurer, issued Apr. 30, 1974. In this patent, a double clad fiber is shown with an inner cladding being pumped with multiple LED sources, although it is clear from the disclosure that these pump sources may also be semiconductor laser sources, such as AlGaAs laser diodes pumping a neodymium doped core of the DCF. Thus, this patent represents one of the earliest disclosures of the concept relating to end pumping of a DCF with pump light from plural semiconductor laser sources.

As is well known in the art, DCFs have a single mode core with a refractive index $n_1$ and having a diameter of several microns, such as approximately 6 $\mu$m, or a multimode core with a refractive index $n_1$ and having a diameter such as 10 $\mu$m or 12 $\mu$m, either of which may be doped with a rare earth active material. A single mode core provides for single mode propagation of a light signal beam in optical communication systems. A first or inner cladding with a refractive index $n_2$, which may be of several tens or hundreds of microns, such as approximately 200 $\mu$m, (sometimes referred to as a pump core and comprising, for example, silica glass, fluoride glass or ZBLAN) surrounds the fiber core and receives pump light from one or more pump light sources for multimode propagation of the pump light. A second or outer cladding with a refractive index $n_3$, wherein $n_1 > n_2 > n_3$, surrounds the inner cladding, which may be comprise of a polymer, and confines the pump light to the inner cladding.

Many advantages arise from the monolithic nature of a DCF laser system in that all components of the system are linked by fiber, rendering them immune to mechanical misalignments or contamination of the optical path, such as from noise and optical losses. The critical links in these systems are at the ends of the fiber where the pump source light or injection source light are coupled into the fiber, and at the transmitter head, where the light is launched into a transmitter telescope to converge the light, via an optical guide into the fiber, such as illustrated in U.S. Pat. No. Re. 33,722 to Scifres et al. At the pump end of such a system, one technology currently employed for coupling light into the fiber is to employ a fiber coupled laser diode bar with the individual outputs of the individual laser emitters of the bar are individually coupled to a fiber and the individual fibers are bundled into a larger aperture, such as through stacking as illustrated in U.S. Pat. No. 5,268,978 to Po et al. and in U.S. Pat. No. Re. 33,722 to Scifres et al., or are fused together as, into a multimode fiber as illustrated also in U.S. Pat. No. Re. 33,722 to Scifres et al. Moreover, their combined output may then be coupled into a multimode fiber, or a telescoped output or fused array of fibers that is a multimode output that is imaged onto the inner cladding of the DCF.

Other current technology for coupling pump light beam and a signal light beam into either a single mode fiber or a double clad fiber, functioning as a fiber amplifier or a fiber laser, comprises free-space optics a dichroic beamsplitter and lens system, as illustrated in FIG. 1. In this scheme, a signal to be amplified from single mode fiber 18 is coupled into a DCF amplifier 19 by a conventional lens system 15A and 15C. The signal beam 18A is transparent to and passing through dichroic mirror 17 into the core of DCF amplifier 19. Pump source 11 comprises a laser diode array or bar 12 where the output emission from the plural emitters are each respectively coupled into a fiber 13. Fibers 13 are bundled at their output ends and the bundled fibers are coupled into a single output, such as optical medium 14, which may be, for example, a multimode fiber. In order to achieve higher pumping powers, multimode laser sources with their combined multimode outputs into a single beam is preferred over other sources. The combined output of pump light 14A is collimated by lens 15B and is reflected by dichroic mirror 17 into the inner cladding of DCF amplifier 19.

While this standard coupling scheme can be made small and self-contained, it presents a potential mechanical weakness in the overall optical system and has relatively high optical losses for the signal beam propagating in the fiber because it is coupled out and then back into the transmission fiber. Taking the case of a DCF as amplifier 19, the coupling of pump light 14A into the inner cladding of the DCF is relatively tolerant since it constitutes a multimode coupling. However, the coupling of signal light beam 18A into the inner core of the DCF is more sensitive to misalignment, since it constitutes a single mode coupling. This is a critical factor. As a general principle, any diffraction limited laser system is a single spatial mode system, whether in fiber or in free space; and the alignment tolerances on single mode systems are severe. The advanced functionality of modern laser systems, particularly multi-stage systems, require that at each stage, the signal is mode matched to the next stage. Fiber laser systems are no exception. However, a fiber laser offers an opportunity to employ commercial fusion splicing since single mode fibers can be spliced together with negligible insertion loss, typically about 0.1 dB to about 0.25 dB. Once spliced, a single mode fiber connection is permanent, provides low loss and is immune to misalignment and contamination.

Breaking the continuity of an injection source single mode fiber 18 in order to inject the multimode pump light into amplifier 19 unnecessarily introduces a free-space single mode coupling into the optical system. In other words, in order to achieve end pumping of DCF amplifier 19, a spaced separation of single mode fiber 18 apart from the end of the DCF is necessary to launch the pump light into the inner cladding of DCF amplifier 19. Consequently, it would be highly desirable to develop a scheme to couple pump light such as from a multimode fiber into a double clad fiber without interrupting the light path of signal beam 18A into the single mode core.

This is not to say that others have not tried to achieve a similar function of coupling a single mode signal source into the core of a DCF and a multimode pump source into the cladding of a DCF without significant loss. U.S. Pat. No. 5,170,458 to Aoyagi et al. suggests such an optical coupler at 46 in FIG. 3 of the patent involving end pumping of a DCF. In FIG. 3 of that patent, coupler 46 is shown as a box with two inputs, one for a signal light 6 via single mode fiber 21 and another for pump light 38 from a semiconductor source 18 via multimode fiber 48. The single output from coupler 46 indicates direct coupling of signal light 6 to a core 52 of double clad fiber 50 and direct coupling of the pump light 38 into inner cladding 54 of fiber 50. In the disclosure, it is indicated that coupler 46 is "of a well-known type", but those skilled in this art, particularly at the time of this disclosure in 1990, were not readily familiar with a single mode/multimode fiber coupled input to a double clad fiber, at least one that had high optical coupling efficiency and was readily available for successful commercial applications. Thus, there is no disclosure in this patent as to how such a coupler should be designed to provide for high efficient light coupling without introducing free-space single mode coupling into the optical system and without some interruption of the core of the signal fiber, whether single mode fiber or DCF.

It is also of interest to note that U.S. Pat. No. 5,170,458 to Aoyagi et al. in FIG. 2 discloses a scheme for side pumping of a DCF from multiple sides of the DCF. The scheme shown is free-space coupling of laser light from plural sources directly into the side of the inner cladding of the DCF. However, this type of coupling does not take full advantage of the numerical aperture (NA) of the fiber inner cladding so that the coupling efficiency is low. On the other hand, U.S. Pat. No. 4,815,079 to Snitzer et al. discloses DCF configurations and illustrates three designs in FIGS. 3–5. of side coupling of a multimode fiber 25 to a DCF 20. Since, here, there is direct coupling of the pump light into the inner cladding, particularly as illustrated in FIG. 3, this approach is likely more efficient than that shown in U.S. Pat. No. 5,170,458. However, these three designs only permit pump light to enter the inner cladding of the DCF from one side of the cladding. Also, in the case of the designs of FIGS. 4 and 5, the NA for the light has to be less than the NA of the fiber so that full advantage of the fiber NA is not being taken into consideration and, therefore, the coupling efficiency is lower. Therefore, less light is coupled into the DCF for pumping applications whereas the desire is to couple as much pump power as possible which results in higher levels of amplification in the DCF.

More recently, an improved side pumping scheme has been proposed and is disclosed in the PCT patent application publication WO 96/20519 to Gapontsev et al., published on Jul. 4, 1996. Publication WO 96/20519 illustrates the coupling arrangement between a multimode pump fiber and a DCF fiber functioning as a fiber amplifier. A multimode light source is coupled into the multimode fiber which has a tapered portion that is partially warped around an exposed portion of the inner cladding of the DCF and is thereafter fused to the inner cladding forming a monolithic integrated tapered structure with the multimode pump fiber integrated longitudinally along the length of the double clad fiber. This configuration is an improvement in side coupling over U.S. Pat. No. 4,815,079 since the multimode pump fiber is integrated into the inner cladding of the double clad fiber. However, as seen in figures of the publication, the multimode light enters the DCF at an angle which has to be less than the NA of the fiber so that, while improved light coupling is achieved, full advantage of the fiber NA is not achieved and, therefore, the coupling efficiency is not as high as in the case where if the multimode pump light could be direct coupled coaxially into the end of the DCF. However, as recognized by those in the art, taking this full NA advantage has not been possible without the use of the free-space approach, described above so that the single mode core of the DCF has to be, in some manner, interrupted in order to permit the end coupling of the light into the DCF inner cladding. Thus, the problem is how to accomplish such end pump coupling to take full advantage of the fiber NA without breaking or otherwise interrupting the DCF core carrying the propagating signal light.

Thus, pumping of DCFs is preferably based on end pumping of the double clad fiber rather than side pumping schemes as discussed above. Such end pumping schemes are favored over side pumping schemes because they can entertain the full NA of the input to the DCF. FIG. 2 illustrates a currently employed end pumping scheme 20 for a DCF, such as in the case of a 9 Watt, Yb doped double clad fiber laser. In FIG. 2, multimode output 26 from a standard pump laser diode bar 22, available from SDL, Inc. of San Jose, Calif., provides, for example, a 17 Watt output power which is delivered, via multimode fiber 24, for collimation and focusing into Yb core doped, DCF 29 using two discrete lenses 27A and 27B. Fiber 29 is provided with cavity mirrors 28A and 28B which are transparent to the pump wavelength or multiple wavelengths but highly reflective of the lasing wavelength within the absorption band of Yb. The NA of multimode fiber 24 is approximately 0.12 whereas the NA of fiber 29 is 0.47. Direct 1:1 imaging of fiber 24 to fiber 29 would not utilize the full NA of fiber. However, by demagnifying the output from the fiber coupled pump laser diode bar by a factor of three to take full advantage of the DCF NA, a much smaller double clad fiber can be employed.

The double clad pump configuration of FIG. 2 meets several of the DCF pump coupler requirements including efficient pump injection, pump brightness conservation and compatibility with a variety of standard pump sources. Over 90% of the pump light can be routinely injected into double clad fiber 29. The output format of fiber coupled pump laser diode bar 22 may be formatted to match any cross-sectional shaped of DCF 29 and the NA match can be easily achieved with lens system 27A and 27B. However, there are several important limitations which limit the end pumping schemes of both FIGS. 1 and 2. First, the single mode to single mode coupling of the signal light is relatively lossy because of the insertion loss of the lenses and dichroic mirror and tight, sub-micron mechanical tolerances for the single mode core alignment. The achievement of 90% coupling is likely, therefore, a maximum upper limit.

Second, the critical mechanical stability of the coupling scheme is made even more difficult by the injection of the high power pump light which may cause heating of the fiber input, possibly resulting in misalignments among the several optical components utilized to achieve optical beam coupling.

Third, the bare, exposed fiber end of either the signal or pump fiber or the DCF may become contaminated. The contamination may not only arise from outside the system but may also be caused by outer fiber cladding material or epoxies creeping over the end of the fiber. These effects have been observed and require careful fabrication particularly of the input end of the DCF. Contamination of the fiber input end core area where power densities are very high will result in fiber core damage with resulting coupling loss or even complete failure of the system.

Fourth, dichroic mirrors are difficult to fabricate. An example is 980 nm pumping of a Yb doped fiber providing an 1060 nm output, requiring high transmission of the 980 nm wavelength requiring a dichroic mirror capable of handling high transmission of the 980 nm wavelength through the mirror and high reflection of the 1060 nm at the mirror. This is accomplished with careful coatings applied to the mirror which must be fairly precise and results in an expensive optical coupling component.

Thus, as indicated previously, the problem then is how to accomplish such end pump coupling to take full advantage of the fiber NA without breaking or otherwise interrupting the DCF core carrying the propagating signal light. The pump light, which is multi-spatial mode, i.e., is distributed over a range of angles across the core of the multimode pump fiber, must be coupled with high efficiency into the inner cladding of the DCF. The multimode coupling could include a free-space coupling, since multimode couplings are much more tolerant of and robust against misalignment. However, the single mode core must be preserved unbroken or uninterrupted. Furthermore, for the end coupling schemes to be commercially viable, they should be compact, robust, and of low cost, as well as capable of accommodating a variety of different double clad fiber dimensions. Depending on the application, the end coupling scheme should readily accommodate different cross-sectional contours of the inner cladding of the DCF, which may be, for example, circular, noncircular, rectangular, or even star-shaped (i.e., a annular contour having a wavy perimeter or irregular boundary surface). The coupling technology must be able to accommodate any of these different fiber shapes. Also, the coupling technology must be of low insertion loss and thermally stabilized. This latter requirement eliminates many of the coupling technologies employed today for use in commercial telcom modules and applications. Typical pump powers are 1 W to 20 W per module. Even if there is a 0.5 dB (10%) loss in the coupling, up to 2 W of generated heat will occur in the optical coupler, which heat must be dissipated from the coupler without introducing misalignment or other forms of mechanical or optical loss.

Thus, a principal object of this invention is to provide optical coupling of a multimode fiber to a fiber that has a single mode core without interrupting or otherwise interfering with the integrity of a fiber's single mode core, multiple single mode cores or multimode core.

A further object of this invention is to provide for more efficient coupling of pump light from a delivery fiber into the inner cladding of a DCF without interrupting or otherwise interfering with the single mode core of the DCF.

Another object of this invention is to provide end coupling of multimode pump source via a multimode fiber coupled into the inner cladding of a DCF without breaking or otherwise interrupting the single mode core of the DCF.

SUMMARY OF THE INVENTION

According to this invention, apparatus for coupling light into a light propagating medium within an optical waveguide comprises an optical fiber having an inner cladding of a predetermined refractive index surrounded by an outer cladding of lower index than the predetermined refractive index forming the optical waveguide and an optical coupler medium, having a refractive index that is substantially the same as the predetermined refractive index, in optical contact with an exposed portion of the inner cladding. The coupler medium has a body portion extending transverse to the longitudinal extent of the fiber for permitting the imaging of light external of the fiber into the inner cladding. The point of imaging in the inner cladding is where the light will be waveguided within the inner cladding of the fiber. Another version of the coupler includes a reflector which functions to reflect light propagating in the inner cladding back into the inner cladding of the fiber.

One version of an optical coupler for coupling light into an optical fiber comprises a double clad fiber (DCF) having a single mode or multimode core with a refractive index $n_1$, an inner cladding with a refractive index $n_2$, and an outer cladding with a refractive index $n_3$, wherein $n_1 > n_2 > n_3$. The couplers of this invention may also be employed for coupling light into multiple cores employed in an optical fiber. In any case, the outer cladding of the fiber is removed from a portion of the fiber exposing the surface of the inner cladding. An optical coupler, comprising glass or other optical material, having a refractive index substantially equal to $n_2$ of the inner cladding, is formed, surrounding at least a portion, if not all thereof, of the exposed inner cladding portion of the fiber forming a bulk optical block that is optically transparent to and may be integrated with the optical material comprising inner cladding. The fiber exposed portion embedded within the coupler may be curved in an arc and is embedded within the optical bulk material. The embedded portion of the fiber may, therefore, be bent laterally, relative to an longitudinal extent of the fiber exiting the coupler, with the embedded portion of the fiber entering the coupler laterally from its side. The fiber radius of curvature in the coupler block is not so small as to bring about significant coupling losses of light out of the core. Thus, the fiber inner cladding in the embedded portion of the fiber within the coupler bulk becomes part of the coupler and the fiber core remains continuous and intact from its point of entry into the coupler and its point of exit from the coupler so that the fiber core remains uninterrupted from its point of origin, through its curved path within the optical coupler block, and onto its point of final destination. Thus, full advantage of the fiber NA is achieved with the signal fiber remaining uninterrupted and, therefore, the coupling efficiency of the pump light is maximized through direct coupling of the pump beam coaxially into the inner cladding of the fiber.

While the present invention pertains to coupling light into an optical fiber waveguide region, for purposes of explanation, reference in the embodiments will be made generally to DCFs having single mode cores. However, it should be realized that the invention is equally applicable to DCFs that have a multimode core or a plurality of single mode cores or to a multimode fiber with a multimode core.

A light source, such as pump light source, is aligned with the longitudinal extent of the fiber exiting the optical block in a manner to direct the light beam through the optical coupler directly into the end of the fiber inner cladding of the fiber at its point of exit from the coupler block. The coupler may also include a lens to converge and focus the pump light beam into the exposed end of the inner cladding within the optical block at the point of exit of the fiber from the coupler. The direction of the light beam is, therefore, transverse to a portion of the core of the DCF potion embedded in the coupler block. The higher index core of the fiber is, therefore, in part, in the path of the directed pump beam. However, since the core diameter is comparatively of a small size, i.e., only a few microns in diameter, the embedded core will not significantly interfere or obstruct the passage of the pump light beam into the inner cladding of the DCF.

Thus, an optical coupling for the pump light is provided by removing a portion of the outer cladding of a DCF and form a material bulk at the removed portion that is refractive index matched to the inner cladding rendering the pump light no longer confined to the inner cladding. Then, simple optics can be employed to reimage the pump light onto a point of the DCF outer cladding where it exits from the coupler.

The optical coupler medium of this invention performs the same function as the lenses and dichroic beamsplitter in the wavelength division multiplexer illustrated in FIG. 1. However, the coupler of this invention combines the pump and signal beams on the basis of their spatial, rather than spectral modal properties. For this reason, we refer to the coupler as a fiber-space-division-multiplexer, or FSDM. The FSDM coupler embeds the DCF within a structure that is index-matched to the inner cladding. External optics may be employed to couple pump light from a pump light source directly into the end of the fiber inner cladding without significantly perturbing the fiber core. Over the revised portion of the fiber that includes the FSDM coupler, the cladding is essentially unguided and light can freely propagate since the outer cladding has been removed, but the coupler forms a larger optical entrance for the pump beam to be coupled directly, end-wise, into the inner cladding of the DCF. A signal light is coupled into the core and remains confined to the core through the fiber as well as through the coupler. Within the index matching block, the fiber is bent through a shallow radius, for example, about a radius of 1 cm, to shift the pump light away from the optical path of the signal light. The pump light is focused in the coupler to a point of the inner cladding of the DCF where it exits the optical coupler. From this point forward, the pump light remains confined to and within the inner cladding of the DCF.

The utility of the robust FSDM coupler of this invention provides the last and most important component for realizing multi-functional laser configurations requiring no external single mode alignments, permitting all different kinds of laser configurations to be realized with double clad fiber laser technology. The FSDM coupler of this invention permits the simplest of configurations to be realized with the adaptation of a fiber laser source arbitrarily scaled in power through the provision of cascaded multiple pump modules added along the length of a single double clad fiber as well as configurations that comprise pulsed, Q-switched and MOPA architectures. Also, the coupler may be employed in cascaded amplifier configurations. Reflector couplers may also be employed in these configurations to counter-reflect unused pump light without interrupting the integrity and continuity of the laser or amplifier DCF core.

Other embodiments are enclosed that utilize the coupler structure as a means for removal of pump light via the coupler and out of the double clad fiber inner cladding for purposes of protecting optical components downstream from the pump light or for monitoring the intensity of the pump light in the inner cladding or the signal light in the core.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 1 is a schematic diagram of a free-space coupler for pump and injection signals as known in the art.

FIG. 2 is a schematic diagram of free-space coupler currently used in the art.

FIG. 3 is a schematic diagram of the FSDM coupler comprising this invention utilized for coupling multimode light into the inner cladding of a DCF without interruption of the DCF single mode core.

FIG. 3A is a cross-sectional view of an alternative fiber having a first multiple core fiber that ay be employed with the FSDM coupler of this invention.

FIG. 3B is a cross-sectional view of an alternative fiber having a second multiple core fiber that may be employed with the FSDM coupler of this invention.

FIG. 3C is schematic diagram of a modified version of the coupler of FIG. 3 for removal of light from the DCF.

FIG. 3D is a cross sectional view taken along the line 3D—3D of FIG. 3C.

FIG. 4 is a more detailed view of the FSDM coupler shown in FIG. 3.

FIG. 5A is a schematic diagram of a plural stage fiber amplifier utilizing the FSDM coupler of this invention for pumping the respective amplifier stages.

FIG. 5B is a schematic diagram of a multiple pumped fiber laser utilizing the FSDM coupler of this invention for pumping along the length of the fiber laser.

FIG. 6 is a schematic side view of another embodiment of the FSDM coupler comprising this invention.

FIG. 7 is a cross-sectional view of the FSDM coupler of FIG. 6 taken along the line 7—7 of FIG. 6.

FIG. 8 is a schematic side view of another embodiment of a FSDM coupler comprising this invention.

FIGS. 9A, 9B and 9C are schematic cross-sectional views of different possible configurations of the FSDM coupler of FIG. 8.

FIG. 10 is a schematic side view of a further FSDM coupler comprising this invention.

FIG. 11 is an illustration relative to a first step in fabricating a FSDM coupler comprising precision removal of the outer cladding from a DCF exposing the inner cladding of the fiber.

FIG. 12 is an illustration relative to a second step in fabricating a FSDM coupler comprising positioning of the DCF exposed inner cladding relative to the coupler substrates.

FIG. 13 is an illustration relative to a third step in fabricating a FSDM coupler comprising the bonding of the DCF to the coupler substrates.

FIG. 14 is a schematic side view of another embodiment of a FSDM coupler with an integral 45° internal reflector.

FIG. 15 is a schematic side view of a further embodiment of a FSDM coupler assembly with an integral 45° internal reflector.

FIG. 16 is a schematic side view of a prior art embodiment for providing a integral 45° internal reflector in the inner cladding of DCF.

FIG. 17 is a schematic side view of a double clad fiber of a first embodiment of this invention having an internal 45° reflector designed to function as a pump light reflector relative to the DCF inner cladding.

FIG. 18 is a schematic illustration of a first step in forming the reflector in the DCF shown in FIG. 17.

FIG. 19 is a schematic illustration of a second step in forming the reflector in the DCF shown in FIG. 17.

FIG. 20 is a schematic side view of a DCF spliced to a single mode fiber with an integral internal reflector for the DCF inner cladding.

FIG. 21 is schematic side view of a DCF spliced to a single mode fiber with an integral internal reflector for the DCF inner cladding similar to FIG. 20 modified with respect to the spliced single mode fiber.

FIG. 22 is a schematic side view of a first embodiment of double clad fiber with a fiber end pumped FSDM coupler.

FIG. 23 is a schematic side view of a second embodiment of double clad fiber with a fiber end pumped FSDM coupler.

FIG. 24 is a schematic side view of another embodiment of a FSDM coupler comprising this invention for reflection of a first light beam already propagating in the inner cladding DCF back into the inner cladding as well as providing for input of a second light beam into the inner cladding.

FIG. 25 is a schematic diagram of a plural stage fiber amplifier utilizing the combination of FSDM coupler and reflector FSDM coupler of this invention for pumping the respective amplifier stages.

FIG. 26 is a schematic side view of a double clad fiber of FIG. 17 except that the reflector formed in the inner cladding of the fiber is provided to remove light from the fiber inner cladding rather than reflecting light back into fiber inner cladding.

FIG. 27 is a schematic side view of a double clad fiber coupler of FIG. 24 except that the coupler is designed to remove light from the fiber inner cladding rather than providing light or reflecting light back into fiber inner cladding.

DETAILED DESCRIPTION OF THE PREFERRED EMBODIMENT OF THE INVENTION

Reference is now made to FIGS. 3 and 4 which illustrate a first embodiment of this invention. In FIG. 3, FSDM coupler 300 comprise an optical medium with two optical fibers 306 and 310 having a point of input to coupler 300. Multimode optical fiber 306 provides pump light from a light source 302 which may be, for example, a semiconductor laser, WDM coupled lasers, laser array or fiber laser, via multimode core 307 which is surrounded by an outer cladding 308. Fiber 306 may be a single mode fiber but the delivery of higher power and brightness is accomplished through the employment of a multimode fiber. Fiber 310 is a DCF having a single mode core 311, an inner pump cladding 312 and an outer cladding 313, as is known in the art comprising a pure silica inner cladding and a polymer outer cladding. Alternatively, as shown in FIG. 3A, fiber 310' may have multiple cores 311B and 311C concentrically disposed in, and having a refractive index higher than, inner pump cladding 312, or, as shown in FIG. 3B, fiber 310" may have multiple cores 311D spatially disposed in, and having a refractive index higher than, inner pump cladding 312. A light signal propagates in single mode core 311 from a source or point of origin 304. As seen in FIGS. 3 and 4, DCF 310 passes through the optical medium of coupler 300 with single mode core 311 intact and uninterrupted and exits from the front of the coupler with its contiguous inner cladding 312 and outer cladding 313 as in the case between its original point of entry to coupler 300 and source 304. The portion of DCF 310 within coupler 300 contains no outer cladding 313 and the inner cladding 312 is optically transparent to the coupler medium, i.e., inner cladding 312 shown in dotted line in FIG. 4 with the coupler medium is of substantially the same refractive index as inner cladding 312. Thus, particularly as viewed in FIG. 3 for example, single mode core 311 has a refractive index of $n_1$, multimode core 307 and inner cladding and the medium comprising coupler 300 may have a refractive index $n_2$, and outer claddings 306 and 313 may have a refractive index $n_3$, where $n_1 > n_2 > n_3$.

It should be noted that in the embodiment of FIG. 3 that the body of coupler 300 need not be completely surround optical fibers 306 and 310 (outer cladding 313 of fiber 310 not shown). As shown in FIGS. 3C and 3D, coupler 300 only needs to surround a portion of fibers 306 and 310, as illustrated with coupler 300A, i.e., in optical contact with the fibers so as to couple pump light from multimode fiber 306 into inner cladding 312 of double clad fiber 310. Therefore, a portion of fibers 306 and 310 can be exposed externally of the bulk of coupler 300.

An important feature of this invention is that the single mode core 311 is not physically interrupted but, rather, is continuous so that any issues relating to single mode signal fiber end alignment with the input end of another fiber, such as DCF, as exists in the prior art couplers of FIGS. 1 and 2 are obviated as well as removing any single mode coupling losses present with such open space couplers. In accordance with the present invention, a short length of outer cladding 313 is removed from DCF 310 and an optical bulk material is placed in direct engagement with the inner cladding 312 having substantially the same refractive index as the fiber inner cladding. This means that, from optical standpoint, inner cladding interface with the lower index cladding has been removed and a light beam can be coupled into DCF 310 without the occurrence of reflection at the interface. To further facilitate the pump coupling with standard fiber coupled pump sources and conventional optics, DCF 310 within the confines of coupler 300 is bent transversely out of the path of input beam 303 to prevent any obstruction of the input of the pump beam as illustrated in FIGS. 3 and 4. As shown in FIG. 4, coupler 300 may include a silica glass or non-silica coupler medium 320 having a refractive index substantially the same as inner cladding 312, with inner cladding 312 and the uninterrupted core 311A embedded with medium 320. Medium 320 may, for example, be about 3 mm in cross-sectional diameter. DCF 310 exists from the front face of medium 320 and the back face carries a coupling lens 322 which focuses beam 303 through the index-matched bulk of medium 320 to the region of the fiber inner cladding 312 at its point of exit 315 from coupler 300 as part of DCF 310. It should be noted that the length of single core 311A with coupler medium 320, being of a refractive index different from medium 320, will cause some light interference or scattering of light beam 303 due to the passage of core 311A in front of the projection of beam 303. However, core 311A is only several microns thick so that such light interference or scattering is minimal. Because of the small size of fiber core 311, which is about 5 $\mu$m to 6 $\mu$m, and the small refractive index step between core 311 and inner cladding 312, the presence of the continuous core 311 will not substantially affect the coupling efficiency of beam 303 into inner cladding 312. Substantially the full power of beam 303 may, therefore, be provided for input to DCF 310 with low insertion loss.

In formation of coupler 300, a portion of outer cladding 313 is removed, typically about several centimeters, and the DCF 310 is placed in a mold jig in the bent form as shown in FIGS. 3 and 4. Next, molten silica glass or other suitable optical material, such as a non-silica material, is poured into the mold and the molten glass takes the form of the mold as well as integrates with the exposed inner cladding of DCF 310 within the mold.

The following issues are important in the design and fabrication of the FSDM coupler 300. First, there should be minimal residual reflections at the interface between inner cladding 312 and medium 320 because these reflections would lead to loss of pump light. Second, the fiber bend radius, R, should be as small as possible so as to maintain as short as possible the distance between input lens 322 to the coupler medium 320 and embedded DCF 310, which also provides for a compact optical coupler. However, radius, R, can not be so small as to interfere with the propagation of the light signal, e.g., result in signal loss due to bending loss. Third, there has to be a well defined sharp transition between the unguided but focused pump beam 303 and the guiding of the pump light in inner cladding 312 such that pump beam 303 can be reimaged at 315 of the inner cladding and continue to be guided in DCF 310. Fourth, the optical components comprising coupler 300 and its inputs and the output should be integrated as much as possible to obtain a mechanically robust optical coupler.

FSDM coupler 300 permits the simplest of configurations to be realized with the adaptation of a fiber laser source arbitrarily scaled in power through the provision of cascaded multiple pump modules added along the length of a single double clad fiber as illustrated in the embodiments of FIGS. 6A and 5B. In FIG. 5A, a cascaded amplifier system 500 is illustrated comprising a rare earth doped DCF 502, similar to DCF 310 in FIG. 4. DCF has a single mode core doped with, for example, Er, Nd, Yb or Er/Yb. Secured along different points of DCF 502 are three FSDM couplers 300A, 300B and 300C respectively coupled at their pump input with pump light sources 504, 506, 508 via optical fibers 505, 507 and 509, respectively. Between couplers 300A and 300B is fiber amplifier A1, between couplers 300B and 300C is fiber amplifier A2 and after coupler 300C is fiber amplifier A3. Each pump module 504, 506, and 508 are each separated from one another, via its respective FSDM coupler 300A, 300B and 300C by the absorption length of the pump light in doped DCF 502. The cascaded amplifier system 500 of FIG. 5A provides for low insertion loss since the signal in the core of DCF 502 is uninterrupted in its propagation through the consecutive fiber amplifiers 300A, 300B and 300C.

In the configuration of FIG. 5B, a fiber laser system 510 is illustrated comprising a rare earth doped DCF 512, similar to DCF 310 in FIG. 4. DCF has a single mode core doped with, for example, Er or Er/Yb. Secured along different points of DCF 512 are three FSDM couplers 300A, 300B and 300C respectively coupled at their pump input with pump light sources 514, 516, 518 via optical fibers 515, 517 and 519, respectively. DCF fiber 512 includes fiber gratings 520 and 522 in the core which are transparent to the pump wavelength of pump sources 514, 515 and 518 but reflective of emission or lasing wavelengths of doped DCF 512 so that a lasing cavity is established between gratings 520 and 522. Each pump module 514, 516 and 518 is separated from each other by the absorption length of the pump light within DCF 512 and is coupled in by a FSDM coupler 300.

An important feature of the embodiments of FIGS. 5A and 5B is that, due to the enhanced coupling of pump light via coupling 300 into the DCF, a larger power output can be achieved with a shorter length of doped DCF, taking into consideration that the distance between light couplers 300A and 300B, and 300B and 300C should be greater than the absorption length of the fiber. Reference is now made to FIGS. 6 and 7 comprising another embodiment of this invention. As shown in FIG. 7, FSDM coupler 600 comprises two small flat silica substrates 602 and 604 which, as is evident from FIG. 6, has a curved etched groove 605 in the surface of substrate 604. DCF 610 comprises single core 611, inner cladding 612 and outer cladding 613. Groove 605 has a depth that is substantially the same dimension as DCF 610 striped of outer cladding 613. A portion of outer cladding 613 is removed from DCF 610 and inserted in groove 605. Optical cement 608, index matched to inner cladding 612 and substrates 602 and 604, is inserted into grove and the two half substrates 602 and 604 are brought together as shown in FIGS. 6 and 7. The radius of fiber 610 within coupler 600 will be around 1 cm limited by the onset of the single mode bending losses imposed at a smaller radius. Based on this radius, the distance required to prevent fiber 610 from obstructing pump beam 603 is around 5 mm. The bonded assembly of substrates 602 and 604 is then polished to obtain a flat input end at the pump input end 605 of assembly 600. Careful alignment during bonding may make this step unnecessary. A compact single plano/aspheric lens 622 is then aligned and bonded to the assembly. Aspheric lens 603 takes the collimated light beam 603 from a standard fiber coupled laser diode pump source and reimages beam 603 through assembly 600 onto the input at 615 of inner cladding 612 of DCF 610 determined by the interface of the outer cladding. Because of the small size of fiber core 611, which is about 5 µm to 6 µm, and the small refractive index step between core 611 and inner cladding 612, the presence of the continuous core 611 will not substantially affect the coupling efficiency of beam 603 into inner cladding 612. Substantially the full power of beam 603 may, therefore, be provided for input to DCF 610 with low insertion loss. One problem of the fiber mounting methods to form FSDM coupler 300 shown in FIG. 4 is that it is difficult to bend the fiber out of the way of the pump source. FIGS. 8–10 show designs of the FSDM coupler that alleviate this problem by having the pump light substantially in side alignment for input into the DCF along its axial length.

In FIG. 8, FSDM coupler 800 is shown. Outer polymer cladding 813 of DCF 810 is stripped over a short length of the fiber, such as several mm to several cm of fiber length, and a glass sleeve 820 is formed around the inner cladding 812 of exposed fiber 810. Sleeve 820 is secured in place by means of index matched optical adhesive, such as an epoxy or cement that are readily available for this purpose. For example, inner cladding 812 may have a refractive index, n, equal to 1.45. Glass sleeve formed on inner cladding 812 also has a refractive index, n, equal to 1.45. After glass sleeve is formed on the exposed fiber, the spacing between sleeve 820 and the stripped ends 813 and 814 are filled with a material that is index-matched to outer cladding 813. Such a suitable material is Teflon®. As seen from FIG. 8, a light beam 803 is directed through side face 816 in a direction along the length of coupler 800 for reception and launching into inner cladding 812 of DCF 810. A focusing lens may be positioned in front of side face 816 for directing the light beam 802 to input point 815. The source for beam 803 may, for example, take the form of a plurality of laser diodes positioned around fiber 810 in fixed relation with their beam outputs coupled into end face 816.

FIGS. 9A, 9B and 9C illustrate various ways in which a DCF 910 of the type having a rectangular-shaped inner cladding 912 surrounding an inner core 911A may be confined within an index-matched glass material. Such a fiber is illustrated in U.S. Pat. No. 4,815,079, which is incorporated herein by its reference. In FIG. 9A, L-shaped glass plates 902 and 904 of the same refractive index as inner cladding 912 are cemented into box-like formation with DCF 910 between them with index-matched epoxy or cement 908. In FIG. 9B, a narrow slot 932 is formed in glass rod or glass ferrule 930 which is index-matched with inner cladding 912. DCF 910 with its inner cladding 912 exposed is inserted into slot 932 after which slot 932 is filled with cement 908 which is index-matched to ferrule 930 and inner cladding 912. In FIG. 9C, a glass rod 940 is diametrically cut into two semi-cylindrical halves 940A and 940B and a groove 942 and 944 is formed in the diametrical center of one or both halves 940A and 940B. Grooves 942 and 944 may be rectangular in shape to accommodate DCF 910 or may be circular to accommodate a standard circular-shaped DCF 950. Once glass portions 902, 904; and 940A, 940B, respectively comprising the coupler bulk 910 and 940, are cemented in place, the regions between the formed glass sleeve and the original outer cladding polymer are filled with another low refractive index material similar to the polymer of the outer cladding of the DCF, such as Teflon®. The pump light, as shown in the case of FIG. 8, is focused onto the glass/Teflon interface cross section of DCF inner cladding 912. By choosing the size of the glass sleeve in any of the embodiments of FIGS. 8 and 9 sufficiently large, typically around several mm to one or more cm, the pump light may be coupled from an exterior source, as shown in FIG. 8, into the inner cladding without being blocked by the DCF.

FIG. 10 is another embodiment of a FSDM coupler 1000 of this invention employing a GRIN glass component 1022 for reception of the input pump light. The GRIN lens coupler 1000 is formed as a sleeve comprising, for example, two halves, formed around exposed inner cladding 1012 of DCF 1010 in a manner as previously explained. The pump light is focused into the exposed inner cladding of the fiber by the focusing properties of the formed GRIN lens 1022 as illustrated in FIG. 10.

In the embodiments of FIGS. 9 and 10, a lens on a side face of the coupler may be employed for focusing the light beam to the exposed inner cladding of the DCF.

The following points are important in the fabrication of the FSDM coupler of this invention. Relative to fabrication of the glass substrates, standard polishing procedures are used to fabricate the substrates. The grooves or slots formed in the glass sleeve portions of the coupler are defined by lithography and an etching process or other mechanical material removal process, such as sand blasting, is carried out to form the groove or the slot depth. Any residual roughness in the groove is not critical as the groove will be subsequently be filled with index-matching epoxy or cement.

Careful attention must be paid to the preparation of the fiber. It is very important that the transition between uncladded and cladded fiber be as sharp as possible to provide a sharp interface between the unguided region in the FSDM coupler and the guided region in the FSDM coupler. Any variation of this interface along the circumference of the fiber will result in pump light losses in that some of the pump light will not be properly guided. The tolerance can be estimated from the focal depth of the focused beam with 0.45 NA. Based on this, it can be estimated that the interface must be straight to within 10 $\mu$m. To obtain this precision, the outer cladding of the DCF is removed employing a directional etching process or laser ablation. This process is schematically illustrated in FIG. 11 for etching. Shown in FIG. 11 is a DCF 1110 having a single mode core 1111 surrounded by an inner cladding 1112 followed by an outer cladding 1113. A shadow mask 1100 is placed over DCF 1110 with a portion of the fiber exposed to the electron or laser beam, as the case may be. The exposed portion of the fiber is subjected to a reactive ion etching (RIE) process to remove the exposed outer cladding polymer. The fiber may be rotated to expose different sides of DCF 1110 to applied RIE beam 1102. As an alternative, plasma etching or laser ablation, such as with an eximer UV laser, may be employed in this step rather than RIE for removing the outer cladding. However, since plasma etching is not directional, rotation of the fiber during processing is generally not required. However, the accuracy may be less due to possible etch undercutting so that fiber rotation is preferred during the application of beam 1102. Also, in the case of employing laser ablation, the fiber should be rotated.

Next positioning and bonding of the fiber to the glass substrates is required. The positioning and bonding of DCF 1110 is schematically illustrated in FIGS. 12 and 13 step. Attention should be paid to that part of inner cladding 1112 that is inserted in the groove or grooves formed in the substrates of the embodiments of FIGS. 6–10 at the end of the exposed fiber where the pump light is coupled into the fiber. The groove in the substrates may be widened at this point to permit easier direct alignment of the fiber with the pump light launched into the FSDM coupler. Also, the length over which the outer cladding is removed is not critical. Optical cements are used that can withstand heating due to high power inputs, such as over 10 Watt of power will be focused over an area of about 200 $\mu$m by 200 $\mu$m in the coupler bulk. As shown in FIG. 12, glass substrates 1202 and 1204 of coupler 1200 are positioned around the inner cladding exposed fiber and then fixed into place by optical epoxy or cement 1208, as shown in FIG. 13, index-matched to inner cladding 1112. It is also within the scope of this invention to employ refractive index-matched glasses or polymers that may be melted and molded into position to form the FSDM coupler.

The coupler input lens, such as lens 322 or 622 in FIGS. 4 and 6, for the pump light has an NA of 0.45 matched to that of the DCF inner cladding. Optical aberrations for a single spherical lens are severe at 0.45 NA and would result in severe distortions with associated pump losses. These aberrations are reduced with the use of an aspherical lens. Such a lens, however, is corrected for only on-axis aberrations, and care has to be taken to properly center the lens. The alignment may either be performed through active optical alignment (pump light input operating and light output from the double clad fiber being monitored) or by mechanical alignment marks and grooves.

While the embodiments of FIGS. 8–13 show means by which the input light beam may be directed substantially from along the axial extent of the DCF so as to alleviate any difficulty that may be encountered in having the exposed inner cladding DCF fiber bent with the FSDM coupler, as shown in FIGS. 4 and 6, there are also ways of directing the light beam into the DCF inner cladding from a direction transverse to the axial extent of the fiber. A first such embodiment is shown in FIG. 14. In FIG. 14, a DCF 1410, comprising a single mode core 1411 surrounded by inner cladding 1412 and outer cladding 1413, has its outer cladding removed from a portion of the fiber which is then surrounded by coupler 1400 comprising a glass sleeve 1420 index-matched to inner cladding 1412. Coupler 1400 may be formed in manner as explained in connection with any of the previous embodiments. Formed sleeve 1420, however, has an angled surface 1402 transverse to the axial extent of fiber 1410 so that light beam 1403 may be directed at an angle transverse to the axial extent of fiber 1410 so that at least a portion of the light is directed into inner cladding 1412 at interface 1415. Thus, the light is redirected by total internal reflection off of angled surface 1404. Surface 1402 may be, for example, at about 45° to receive beam 1403 at an angle normal to the fiber axial or longitudinal extent. Since of the light from beam 1403 may have a substantial divergence, some fraction of the pump light may exceed the total internal reflection angle of surface 1404 and be transmitted through surface 1402. Thus, it may be desirable to place a reflective coating on outer surface 1402 to prevent this from occurring. Beam 1403 does not need to be exactly perpendicular to the axis of fiber 1412. There is some loss of light input at interface 1415 due to light propagating in coupler 400 at angles outside of the aperture of inner cladding at interface 1415. Reflecting surface 1402 of coupler 1400 may, therefore, be slightly concaved so that beam 1403 is more focused to the aperture of inner cladding 1412 at interface 1415. A lens 1422 may be formed on the surface of coupler 1400 to provide better coupling of the light beam 1403 into inner cladding 1412 at 1415 by means of focusing the beam. Pump light 1403 is, thus, coupled into DCF 1510 from a direction fairly normal to the fiber employing an angled glass sleeve 1420 that has a 45° angled end facet 1404.

In FIG. 15, FSDM coupler assembly 1500 comprises a unitary structure with a glass sleeve 1520 formed on a portion of DCF 1510 within coupler assembly 1500 with its outer cladding removed. Sleeve 1520 is of an optical material that is index-matched to the inner cladding of DCF 1510. Sleeve 1520 has an approximate 45° angled face or facet 1502. The end of multimode fiber 1506 is secured to coupler assembly 1500 and is optically coupled to light bus (e.g., an optical waveguide or tapered waveguide) or focusing optics 1522 for directing light beam 1503 propagating in fiber 1506 into sleeve 1520 and internally reflected off of facet surface 1504 and directed into the aperture represented by the inner cladding of the fiber at interface 1515. Thus, the light is redirected by total internal reflection off of angled surface 1504. Surface 1502 may be, for example, at about 45° to receive beam 1503 at an angle normal to the fiber axial or longitudinal extent. Since of the light from beam 1503 may have a substantial divergence, some fraction of the pump light may exceed the total internal reflection angle of surface 1504 and be transmitted through surface 1502. Thus, it may be desirable to place a reflective coating on outer surface 1502 to prevent this from occurring. Facet surface 1504 may also be slightly concaved to function as a focusing mirror for directing beam 1503 into the inner cladding at 1515.

A different pump light beam coupled input scheme known in the prior art is shown in FIG. 16. After stripping away a portion of outer cladding 1613 of the fiber, a portion of the exposed inner cladding 1612 of DCF 1610 is etched away at 1601 forming an angled face reflector 1602. The angle of reflector 1602 may be approximately 40° relative to axial extent of fiber 1610. Pump light 1603 is directed at approximately right angle relative to axial extent of fiber 1610 and is reflected by total internal reflection from internal facet surface 1604 and launched into inner cladding 1612 at an angle where it propagates down the inner cladding 1612. High coupling efficiency has been demonstrated using this technology. The attractiveness of this approach is that no glass interface of the type shown in previously discussed embodiment herein is required to be bonded to inner cladding 1612. However, the approach of FIG. 16 has several severe drawbacks. First, only a small part of inner cladding 1612 is available which is determined by the very small area of the etched inner cladding, limiting the maximum power that can be possibly injected into inner cladding 1612. Second, the pump light beam coupled input scheme of FIG. 16 is strongly dependent on fiber geometry and the resulting etched reflector depends on the shape of fiber 1610, which shapes are very different for round, rectangular and hexagonal shaped inner claddings as the light, being coupled through the side of the fiber, results in optical distortions. Third, the mechanical integrity of the fiber can be affected by the material removal from the fiber, particularly from inner cladding 1612 having an affect on the propagating and other optical properties as well. Therefore, for the most efficient coupling of input pump light into the inner cladding, the FSDM coupler of this invention is a more preferred approach for pump light input.

In any of the foregoing embodiments, an injected light signal is amplified in the doped core of the DCF which may function either as a fiber amplifier or a fiber laser. Once the pump light is coupled into the DCF inner cladding, the pump light criss-crosses the fiber core and is absorbed to produce gain at the absorption wavelength of the core. A Yb doped fiber laser behaves like a three-level lasing system at short wavelengths so that unpumped sections of the fiber act as a strong absorber at the short wavelength end of the gain spectrum. For operation at these shorter wavelengths, it is often necessary to use a short fiber so that a high population inversion is maintained over the entire length of the fiber. Typically, the amplified beam is recovered by splicing the forward end of the DCF to a single mode fiber. The large amount of pump light at the end of the multimode DCF reduces laser efficiency and presents significant heating problems. The excess light tends to heat the single mode fiber and any hardware surrounding the splice. The heat generated can burn the fiber and cause its destruction. Some of the residual pump light at this point is coupled directly into the cladding of the single mode fiber and the rest of the pump light escapes from the cleaved end of the DCF fiber. The splice destroys the flatness of the double clad fiber end facet so that utilizing this end surface as a mirror facet to reflect back unabsorbed pump light into the double clad fiber is not possible. At the point of splice, any residual pump light present at this point is therefore lost at the splice. It would be advantageous at the output end of the DCF to reflect back this residual pump light to make a second pass through the fiber where most of it would be absorbed. Such unabsorbed light in some systems can be as much as one-third of the total pump light. A solution for this problem is to fabricate a 45° angled cutout or groove 1700 into the fiber, as shown in FIG. 17, after removal of a portion of outer cladding 1713 at some point near the output end of DCF 1710. As indicated in FIG. 17, groove 1700 would extend inward into the fiber along all sides transversely to the axial extent of the fiber and would function as a corner reflector for residual pump light propagating down inner cladding 1712 of DCF 1710. As can been seen from FIG. 17, that 45° groove 1700 does not extend all the way to core 1711 of the fiber so that the single mode core will be unaffected. Pump light incident on the glass/air interface 1702 experience total internal reflection. As the pump light has wide angular dispersion at this point, some of the pump light rays 1704 will interact with the reflecting surface at an angle close to perpendicular to the surface and will not be totally internally reflected. A reflective coating of dielectric or metal material may be applied at 1702 by evaporation or sputtering to enhance the reflectivity of these light rays 1704.

Fabrication of the 45° cutout or groove 1700 is accomplished by first removing a portion 1701 the outer cladding 1713 in a manner as previously explained, and, then, etching the exposed glass fiber inner cladding 1712 employing a suitable mask 1708 that is non-reactive to the etchant. These steps are illustrated in FIGS. 18 and 19. The exposed portion of fiber 1710 is first dipped in a glass etching solution, such as, for example, ammonium bifluoride, which commences to dissolve the exposed inner cladding glass. The etchant is not anisotropic so that as the glass of inner cladding is etched away, the enchant will also undermine the mask 1708, as shown at 1705 and illustrated in FIG. 19. By choosing the etching parameters, as is known in the art, it is possible to produce a inner cladding etched surface 1702 at a 45° angle relative to the axis of the fiber. The depth of groove 1700 is controlled by the etching time.

It should be noted that the structure of FIG. 17 can also be easily changed to direct pump light out of the inner cladding of the double clad fiber rather than reflecting it within the inner cladding as shown in FIG. 17. Such an altered structure is shown in FIG. 26. As in the case of FIG. 17, there is a reflecting, annular groove 2600 formed into inner cladding 2612 of DCF 2610. DCF 2610 includes core 2611 surrounded by inner cladding 2612, which is surrounded by outer cladding 2613. Groove 2600 maybe, but does not have to be, 45° relative to the longitudinal axis of the fiber. However, groove is slanted away from the direction of pump light propagation, compared to the embodiment of FIG. 17, so that a substantial portion of the pump light 2602 or at least a small percentage of the pump light 2602 or substantially all of the pump light 2602 is directed out of the fiber. The amount of pump light directed out is governed by the depth of groove 2600, although the depth may be difficult to control since the inner cladding 2612 is of small diameter, e.g., 200 $\mu$m. In any case, such a structure has utility, for one example, in eliminating high levels of pump light downstream from damaging or otherwise from reaching optical components downstream from the coupling-out point of the pump light 2602. Another example is the use of the extracted pump light 2602 for monitoring the intensity of the pump light, or the intensity of the signal light in core 2611, based upon the amount of pump light absorbed in DCF 2610, which is determined from a comparison of the intensity pump light 2602 with the original pump light as provided at the forward end of DCF 2610.

FIGS. 20 and 21 illustrate two other embodiments for preserving excess or residual pump light and maintaining good optical coupling efficiency at a splice 2008 between a DCF 2010 and single mode fiber 2005. As an example, splice 2008 may be accomplished by fusion splicing. In FIG. 20, a high reflecting (HR) coating 2000 is applied to an exposed end of DCF 2010 at the point of splicing with single mode fiber 2007 comprising outer cladding 2007 surrounding core 2006. Core 2006 of single mode fiber 2005 is aligned with core 2011 of DCF 2010. HR coating 2000 covers a portion of outer cladding 2013 and, importantly, a substantial portion of exposed end 2002 of inner pump cladding 1012 of DCF 2010. Residual pump light 2001 would be reflected back from mirror surface 2004 into inner cladding 2012, as shown at 2003 where it is further absorbed through interaction with doped fiber core 2011. This would increase population inversion near the output end of a longer length fiber laser comprising DCF 2010, allowing operation at shorter wavelengths. Laser efficiency is enhanced because the pump light is being reflected back, such as at 2003, and thereafter absorbed in the fiber gain medium core 2011. Also, possible damage to the fiber or splice 2008 due to fiber heating from unused pump light is reduced since only a small portion of the pump light, indicated at 2001A, continues at point 2015 in the cladding 2007 of fiber 2005. HR reflective coating 2000 may be comprised of a aluminum or other metal coating evaporated onto the end of the spliced DCF 2010. In FIG. 21, the forward end 2009 of single mode fiber 2005 at HR coating 2000 is reduced in diameter by means of etching to reduce even further the amount of pump light that can coupled at 2015 into fiber cladding 2007 while also correspondingly increasing the amount reflection area a small amount which increases the amount of pump light 2001 that will be internally reflected back from a now larger reflecting surface 2004A, back into inner cladding 2012, as illustrated at 2003. A feature of this embodiment is that since fiber 2005 has been reduced in diameter at end 2009, the possible damage to the fiber or splice 2008 due to fiber heating from unused pump light is almost eliminated.

FIG. 22 illustrates a complete end pumped FSDM coupler where glass coupler 2200 is formed on the end of DCF 2210. A portion of outer cladding 2213 at a terminal of DCF 2210 is stripped away, exposing inner cladding 2212 and glass coupler 2200 is cemented on the end of the fiber. Coupler 2200 may be a glass bulk material with a central bore 2201 having a refractive index matched with inner cladding 2211 and cemented on inner cladding 2212 using an index-matched epoxy or cement. On the other hand, coupler 2200 may have the structural assembly as shown in any one of FIGS. FIGS. 9A, 9B or 9C. An outer coating material 2205, index-matched to outer cladding 2213, is applied to exposed portions of inner cladding 2212 between the terminal end of outer cladding 2213 and inner face 2207 of coupler 2200. Material 2205 may be, for example, Teflon®. A dielectric reflector 2226, transparent to pump light wavelength but reflective of light in the fiber core 2211 at the wavelength of the gain of the core rear earth dopant, is cemented with optical epoxy or cement 2225 (transparent to the pump light wavelength) on polished outer end 2202 of coupler to permit transmission of pump light 2203, focused by lens 2204.

An alternative configuration for end pumping with a complete end pumped FSDM coupler is shown in FIG. 23. In FIG. 23, a single mode fiber section 2300, comprising a core 2308 and outer cladding 2309, is aligned and spliced to the terminal end of DCF 2310, comprising single mode core 2311 surrounded by inner cladding 2312 which, in turn, is surrounded by outer cladding 2313. Outer cladding 2309 of the single mode fiber section 2300 is larger in diameter than inner cladding 2312 of DCF 2310 making it ideal for use as a coupler. An outer coating material 2305, index-matched to outer cladding 2313, is applied to exposed portions of inner cladding 2312 between the terminal end of outer cladding 2313 and inner face 2307 of coupler 2300. Material 2305 may be, for example, Teflon®. A dielectric reflector 2326, transparent to pump light wavelength but reflective of light in the fiber core 2311 at the wavelength of the gain of the core rear earth dopant, is cemented with optical epoxy or cement 2325 (transparent to the pump light wavelength) on polished outer end 2302 of coupler to permit transmission of pump light 2303.

In FIG. 24, the rare earth doped core 2411 DCF 2410 is continuous through FSDM coupler 2400, and provides for means to reflect propagating pump light back into the inner cladding 2412 of DCF 2410 and, thus, is similar in strategy to the reflector embodiments illustrated in FIGS. 20 and 21. Transmission DCF 2410 comprises core 2411 surrounded by inner cladding 2412 followed by outer cladding 2413. A FSDM coupler 2400 is formed on a portion of DCF 2410 from which outer cladding 2413 has been removed in a manner as previous explained. A glass block or coupler medium 2420 is then formed on the exposed DCF inner cladding portion with that portion also curved in the medium as illustrated in FIG. 24. Coupler medium 2420 may be comprised of silica glass index-matched to the glass material comprising inner cladding 2412. Medium 2420 may be formed of glass molded about the exposed DCF inner cladding portion or fabricated in a manner as previously explained, such as illustrated in FIGS. 6, 9 and 10. As result, medium 2420 becomes basically an integral part of inner cladding 2412 with an embedded curved core portion 2411A formed in the block as shown in FIG. 24. In order to prevent light loss from remaining exposed portions of the exposed DCF inner cladding portion, a material 2405 index-matched to outer cladding 2413 is applied to regions of this portion between the terminal ends of the outer cladding 2413 and faces 2408 and 2409 of block 2420. For example, material 2405 may be Teflon®. Medium 2420 include an output/input face 2415 for pump light 2403, such as at wavelength, $\lambda_1$, already propagating in DCF inner cladding 2412 that has not been absorbed by the rare earth dopant in core 2411 to exit coupler block 2420. Outside of medium 2420 at face 2415 is lens 2404 and reflector 2406. Lens 2404 and reflector 2406 are positioned in relation to medium 2420 so that any light 2403 emitted at a well defined interface 2417 between inner cladding 2412 and medium 2420, where the outer cladding or index-matched outer cladding terminates, is reimage via lens 2404 and reflector 2406 back onto itself, i.e., light beam 2403 is reflected back by reflector 2403 and focused, via lens 2404 directly back to interface 2417 for counter propagation and further interaction with doped core 2411.

In a further extension of the embodiment of FIG. 24, reflector 2407 may be a dichroic mirror so that its back surface 2406A reflects light beam at wavelength, $\lambda_1$, whereas a second light beam 2407 wavelength, $\lambda_1$, can be introduced at front surface 2406B at wavelength, $\lambda_2$, which is transparent in reflector 2406 and passes through reflector 2406 and is focused by lens 2404 to interface 2417. Thus, the combination of both reflected light beam 2403 and transmitted light beam 2407 can be launched into the inner cladding 2412 of DCF 2410 providing efficient high power pumping of DCF 2410.

It should be noted that the structure of FIG. 24 can also be easily changed to direct pump light out of the inner cladding of the double clad fiber rather than reflecting it back into the inner cladding as well as launching additional light into the inner cladding of the double clad fiber as illustrated in FIG. 24. Such an altered structure is shown in FIG. 27. As in the case of FIG. 24, the rare earth doped core 2711 of DCF 2710 is continuous through coupler 2700, and provides for means to extract propagating pump light back from inner cladding 2712 of DCF 2710. DCF 2710 comprises core 2711 surrounded by inner cladding 2712 followed by outer cladding 2713. Coupler 2700 is formed on a portion of DCF 2710 from which outer cladding 2713 has been removed in a manner as previous explained. A glass block or coupler medium 2720 is then formed on the exposed DCF inner cladding portion with that portion also curved in the medium as illustrated in FIG. 27. Coupler medium 2720 may be comprised of silica glass index-matched to the glass material comprising inner cladding 2712. Medium 2720 may be formed of glass molded about the exposed DCF inner cladding portion or fabricated in a manner as previously explained, such as illustrated in FIGS. 6, 9 and 10. As result, medium 2720 becomes basically an integral part of inner cladding 2712 with an embedded curved core portion 2711A formed in the block as shown in FIG. 27. A material 2705 index-matched to outer cladding 2713 is applied to regions of this portion between the terminal ends of the outer cladding 2713 and faces 2708 and 2709 of block 2720. For example, material 2705 may be Teflon®. Medium 2720 includes an output face 2715, which is AR coated, for removal of pump light 2703, at wavelength, $\lambda_p$, already propagating in DCF inner cladding 2712 that has not been absorbed by the rare earth dopant in core 2711 and exits coupler block 2720. Coupler 2700 has utility, for one example, in eliminating high levels of pump light, downstream from propagating signal in core 2711, from damaging or otherwise from reaching optical components downstream from the coupling-out point of the pump light 2703. Another example is the use of the extracted pump light 2703 for monitoring the intensity of the pump light, or the intensity of the signal light in core 2711, based upon the amount of pump light absorbed in DCF 2710, which is determined from a comparison of the intensity pump light 2703 with the original pump light as provided at the forward end of DCF 2710.

As shown in FIG. 25, the reflector FSDM couplers 2400 of FIG. 24 can be employed in combination with the FSDM couplers 300 of FIG. 4 for different applications, such as for pumping fibers amplifiers or fiber lasers as exemplified in FIGS. 5A and 5B. In FIG. 25, a cascaded amplifier system 2500 is illustrated comprising a rare earth doped DCF 2502. DCF 2502 has a single mode core doped with, for example, Er, Nd, Yb or Er/Yb. Secured along different points of DCF 2502 are three FSDM couplers 300A, 300B and 300C respectively coupled at their pump input with pump light sources 2504, 2506, 2508 via optical fibers 2505, 2507 and 2509, respectively. Beyond coupler 300A is fiber amplifier A1, which at its other end, is coupled through reflector FSDM 2400A which includes lens 2404A and reflector 2406A. Thus, amplifier A1 is pumped with co-propagating light from pump 2504 via coupler 300A and counter propagating light from reflector coupler 2400A. Beyond coupler 300B is fiber amplifier A2, which at its other end, is coupled through reflector FSDM 2400B which includes lens 2404b and reflector 2406B. Amplifier A2 is pumped with co-propagating light from pump 2506 via coupler 300B and counter propagating light from reflector coupler 2400B. Beyond coupler 300C is fiber amplifier A3, which at its other end, is coupled through reflector FSDM 2400C which includes lens 2404C and reflector 2406C. Amplifier A3 is pumped with co-propagating light from pump 2508 via coupler 300C and counter propagating light from reflector coupler 2400C. By using reflector couplers 2400A, 2400B and 2400C, the length of the fiber for amplifiers A1, A2 and A3 can be shorten. In the case where this coupler combination is employed as in the laser system 510 of FIG. 5B, the resonator length of the laser can be materially shortened with the presence of reflector couplers 2400A, 2400B and 2400C. Moreover, the cascaded amplifier system 2500 of FIG. 25 provides for low insertion loss since the signal in the core of DCF 2502 is uninterrupted by the several optical couplers 300A, 2400A, 300B, 2400B, 300C and 2400C in its propagation through the consecutive fiber amplifiers 300A, 300B and 300C.

Although the invention has been described in conjunction with one or more preferred embodiments, it will be apparent to those skilled in the art that other alternatives, variations and modifications will be apparent in light of the foregoing description as being within the spirit and scope of the invention. For example, the embodiments of the coupler comprising this invention as illustrated in FIGS. 6, 8, 10, 14, 15 and 24 may also be employed in the applications illustrated for coupler 300 in FIGS. 5A and 5B. Also an important consideration, the foregoing embodiments all generally relate to the launching of pump power into a DCF. However, the optical couplers disclosed comprising this invention may be employed for input of an optical source for any desired purpose for treating the propagating signal light in the single mode core of the DCF other than just for pumping and amplification, or for scaling power outputs for laser material treatment. Moreover, the optical couplers disclosed comprising this invention may be utilized for coupling light into a cladding containing more than one single mode core, i.e., multiple single mode cores or coupling light into a multimode core. Further, the coupler of this invention may be employed with a multimode fiber having a multimode core as well a DCF. Lastly, an optical material or covering, having a refractive index higher than both the coupler medium and the inner cladding may be provided on the exposed surface of the inner cladding portion upon which the coupler medium is formed. Thus, the invention described herein is intended to embrace all such alternatives, variations and modifications that are within the spirit and scope of the following claims.

What is claimed is:

1. Apparatus for coupling light into a light propagating medium within an optical waveguide comprising:

an optical fiber having an inner cladding of a predetermined refractive index surrounded by an outer cladding of lower index than said predetermined refractive index comprising said optical waveguide; and an optical coupler medium in optical contact with an exposed portion of said inner cladding, said coupler medium have a body portion extending transverse to the longitudinal extent of said fiber for permitting the imaging of light external of the fiber into said inner cladding, wherein said inner cladding includes multiple cores having a refractive index higher than said inner cladding.

2. The apparatus of claim 1 wherein said multiple cores are single mode or multimode.

3. Apparatus for coupling light into a light propagating medium within an optical waveguide comprising:

an optical fiber having an inner cladding of a predetermined refractive index surrounded by an outer cladding of lower index than said predetermined refractive index comprising said optical waveguide; and an optical coupler medium in optical contact with an exposed portion of said inner cladding, said coupler medium have a body portion extending transverse to the longitudinal extent of said fiber for permitting the imaging of light external of the fiber into said inner cladding, wherein at least part of the length of said inner cladding portion formed in said coupler medium extends transversely out of said body portion.

4. Apparatus for coupling light into a light propagating medium within an optical waveguide comprising;

an optical fiber having an inner cladding of a predetermined refractive index surrounded by an outer cladding of lower index than said predetermined refractive index comprising said optical waveguide; and an optical coupler medium in optical contact with an exposed portion of said inner cladding, said coupler medium have a body portion extending transverse to the longitudinal extent of said fiber for permitting the imaging of light external of the fiber into said inner cladding, wherein said coupler medium includes at least one substrate having a groove within which said inner cladding portion is placed.

5. Apparatus for coupling light into a light propagating medium within an optical waveguide comprising:

an optical fiber having an inner cladding of a predetermined refractive index surrounded by an outer cladding of lower index than said predetermined refractive index comprising said optical waveguide; and an optical coupler medium in optical contact with an exposed portion of said inner cladding, said coupler medium have a body portion extending transverse to the longitudinal extent of said fiber for permitting the imaging of light external of the fiber into said inner cladding, wherein at least one core is included in said inner cladding, said core is doped with an active element, and a reflector provided along the length of or at a terminal end of said fiber to reflect unabsorbed, residual light of the light beam propagating in said inner cladding back into said inner cladding for further absorption in said doped core, wherein said reflector also provides for introduction of another light beam into said inner cladding portion via said reflector.

6. The apparatus of claim 1 wherein said inner cladding comprises a multimode core.

7. Apparatus for coupling light into a light propagating medium within an optical waveguide comprising;

an optical fiber having an inner cladding of a predetermined refractive index surrounded by an outer cladding of lower index than said predetermined refractive index comprising said optical waveguide; and an optical coupler medium in optical contact with an exposed portion of said inner cladding, paid coupler medium have a body portion extending transverse to the longitudinal extent of said fiber for permitting the imaging of light external of the fiber into said inner cladding, wherein said coupler medium is a GRIN lens.

8. Apparatus for coupling light into a light propagating medium within an optical waveguide comprising:

an optical fiber having an inner cladding of a predetermined refractive index surrounded by an outer cladding of lower index than said predetermined refractive index comprising said optical waveguide; and an optical coupler medium in optical contact with an exposed portion of said inner cladding, said coupler medium have a body portion extending transverse to the longitudinal extent of said fiber for permitting the imaging of light external of the fiber into said inner cladding, wherein said coupler medium includes a lens for focusing the light into said inner cladding portion.

9. A gain medium system comprising:

a double clad fiber (DCF) having a core doped with an active element surrounded by an inner cladding which is surrounded by an outer cladding;

a plurality of pump light sources coupled to said double clad fiber at sequential positions along a length of the fiber;

an optical coupler medium, having a refractive index that is substantially the same as a refractive index of said inner cladding in optical contact with an exposed portion of said inner cladding, said coupler medium have a body portion extending transverse to the longitudinal extent of said fiber for permitting the imaging of co-propagating pump light external of the fiber into said inner cladding at said positions without interrupting the continuity of said fiber core, further comprising a reflector coupler having a refractive index that is substantially the same as a refractive index of said inner cladding and in optical contact with an exposed portion of said inner cladding and formed at a position thereon preceding the position of at least one of said coupler mediums for reflecting co-propagating pump light unabsorbed by the fiber core back into said inner cladding.

10. The gain medium system of claim 9 wherein said reflector coupler is a dichroic reflector to permit another pump light to be coupled into said inner cladding in a counter propagating direction to the co-propagating pump light.

11. Apparatus for coupling light comprising:

a double clad fiber (DCF) having a core doped with an active element surrounded by an inner cladding having a predetermined refractive index and surrounded by an outer cladding;

a pump light source providing a light beam;

an optical coupler medium, having a refractive index that is substantially the same as said predetermined refractive index, in optical contact with an exposed portion of said inner cladding, said coupler medium have a body portion extending transverse to the longitudinal extent of said fiber for permitting the imaging of light external of the fiber into said inner cladding, wherein said coupler medium includes at least one substrate having a groove within which said inner cladding portion is positioned.

12. Apparatus for coupling light comprising:

a double clad fiber (DCF) having a core doped with an active element surrounded by an inner cladding having a predetermined refractive index and surrounded by an outer cladding;

a pump light source providing a light beam;

an optical coupler medium, having a refractive index that is substantially the game as said predetermined refractive index, in optical contact with an exposed portion of said inner cladding, said coupler medium have a body portion extending transverse to the longitudinal extent of said fiber for permitting the imaging of light external of the fiber into said inner cladding, wherein Paid coupler medium is a GRIN lens.

13. Apparatus for coupling light into an optical medium comprising:

an optical fiber comprising said medium and having a core with a refractive index $n_1$, an inner cladding with a refractive index $n_2$, and an outer cladding with a refractive index $n_3$ over at least a portion of said fiber, wherein $n_1 > n_2 > n_3$;

a portion of said outer cladding removed from a fiber portion exposing the inner cladding therealong with said core embedded therein;

an optical coupler medium formed on said exposed inner cladding portion of said fiber and comprising an optical material with a refractive index substantially equal to $n_2$, in optical contact with said exposed inner cladding and substantially in coaxial alignment with the longitudinal extent of the fiber, said embedded core within said coupler medium curved transversely out of said coupler medium to exit therefrom from a side of said coupler medium; and a light source in co-axial alignment with the longitudinal extent of the fiber and having a light output coupled into said coupler medium for direct optical coupling into said inner cladding.

14. A method of forming a fiber space division multiplexer (FSDM) formed on a double clad fiber having a core of refractive index $n_1$, an inner cladding of refractive index $n_2$, and an outer cladding of refractive index $n_3$, wherein $n_1 > n_2 > n_3$ comprising the steps of removing the outer cladding along a portion of the fiber;

embedding the exposed inner cladding fiber portion with an optical medium having a refractive index substantially equal to $n_2$; and focusing external pump light through the medium into the inner cladding at a point where the light will be waveguided by the fiber.

15. The method of claim 14 wherein the step of focusing is carried out with a lens system, a GRIN lens or an angled reflector that is angled with respect to at least a portion of the axis of the fiber.

16. The method of claim 14 comprising the further step of curving the embedded fiber portion within the coupler medium away from a focused direction of the external pump light into the inner cladding to optimize pump light coupling.

17. An optical fiber comprising:

a double clad fiber (DCF) having a core doped with an active element at least partially surrounded by an inner cladding which is surrounded by an outer cladding;

a groove extending through said outer and at least a portion of said inner cladding and having surface at said inner cladding that reflects light propagating in said inner cladding in a direction out of said inner cladding through said groove and out of said fiber.

18. The optical fiber of claim 17 wherein the removal of said inner cladding propagating light prevents potential damage to optical components coupled downstream from said groove.

19. The optical fiber of claim 17 wherein said inner cladding propagating light removed from said inner cladding is employed to monitor an intensity of pump light in said inner cladding or signal light in said doped core.

20. An optical fiber comprising:

a double clad fiber (DCF) having a core doped with an active element surrounded by an inner cladding having a predetermined refractive index and surrounded by an outer cladding;

a pump light source providing a light beam for launching into said inner cladding;

an optical coupler medium, having a refractive index that is substantially the same as said predetermined refractive index, in optical contact with an exposed portion of said inner cladding, said coupler medium have a body portion extending transverse to the longitudinal extent of said fiber including an output face for permitting the extraction of pump light from said inner cladding.

21. The optical fiber of claim 20 wherein the extraction of said pump light is employed to prevent potential damage to optical components coupled downstream from said optical coupler medium.

22. The optical fiber of claim 20 wherein the extraction of said pump light is employed to monitor an intensity of pump light in said inner cladding or signal light in said doped core.

* * * * *

UNITED STATES PATENT AND TRADEMARK OFFICE
CERTIFICATE OF CORRECTION

PATENT NO. : 6,477,295 B1 Page 1 of 1
DATED : November 5, 2002
INVENTOR(S) : Lang et al.

It is certified that error appears in the above-identified patent and that said Letters Patent is hereby corrected as shown below:

Column 23,
Line 43, "Paid" should read -- said --

Signed and Sealed this

Nineteenth Day of August, 2003

JAMES E. ROGAN
*Director of the United States Patent and Trademark Office*